(12) United States Patent
Miyazaki et al.

(10) Patent No.: US 6,483,270 B1
(45) Date of Patent: Nov. 19, 2002

(54) METHOD AND DEVICE FOR CONTROLLING POSITION SENSORLESS MOTOR

(75) Inventors: Shinichi Miyazaki, Suwa (JP); Kunio Tabata, Suwa (JP); Akihito Uetake, Suwa (JP); Akihiko Ikegami, Suwa (JP); Osamu Shinkawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/508,582

(22) PCT Filed: Jul. 14, 1999

(86) PCT No.: PCT/JP99/03804

§ 371 (c)(1),
(2), (4) Date: Oct. 6, 2000

(87) PCT Pub. No.: WO00/04632

PCT Pub. Date: Jan. 27, 2000

(30) Foreign Application Priority Data

| Jul. 16, 1998 | (JP) | 10-202338 |
| Jul. 24, 1998 | (JP) | 10-210010 |
| Oct. 1, 1998 | (JP) | 10-280368 |
| Jan. 27, 1999 | (JP) | 11-018476 |

(51) Int. Cl.[7] .............. H02P 1/46; H02P 3/18; H02P 5/28; H02P 7/36
(52) U.S. Cl. ............ 318/700; 318/705; 318/806; 318/811; 318/609; 363/176
(58) Field of Search .............. 318/700, 705, 318/709, 711, 715, 720–724, 738–798, 802, 806, 811, 599, 602, 609, 719, 254, 138, 439; 363/108, 109, 170, 176, 138

(56) References Cited

U.S. PATENT DOCUMENTS

| 4,673,849 | A | * | 6/1987 | Sears et al. ............. 318/138 |
| 5,103,151 | A | * | 4/1992 | Kondo et al. ............ 318/685 |
| 5,703,449 | A | * | 12/1997 | Nagate et al. ............ 318/254 |
| 5,783,917 | A | * | 7/1998 | Takekawa ............... 318/254 |
| 5,814,957 | A | * | 9/1998 | Yoshida ................. 318/138 |
| 6,034,493 | A | * | 3/2000 | Boyd et al. ............ 318/138 |
| 6,034,494 | A | * | 3/2000 | Kitamine et al. ........ 318/254 |
| 6,218,795 | B1 | * | 4/2001 | Syukuri ................ 318/138 |

* cited by examiner

Primary Examiner—Robert E. Nappi
Assistant Examiner—Edgardo San Martin
(74) Attorney, Agent, or Firm—Kaneska & Takeuchi

(57) ABSTRACT

The present invention relates to a control method and a control device for a position sensorless motor which has position sensorless operation and synchronized operation, wherein a rotation position of a rotor is detected on the basis of counter electromotive forces generated in stator coils in the position sensorless operation, the stator coils are excited in synchronization with the detected rotation position of the rotor to rotate the rotor and a deviation between a target position and the present position is determined from a target rotation position according to the position command signal and the detected rotation position, position sensorless close loop drive is made on the basis of the determined deviation, and when the synchronized operation is made, the stator coils of the motor are excited in synchronization with the position command signal to rotate the rotor.

22 Claims, 32 Drawing Sheets

METHOD AND DEVICE FOR CONTROLLING POSITION SENSORLESS MOTOR

TECHNICAL FIELD

The present invention relates to a method for controlling a position sensorless motor and a control device thereof, and also a method and a device for frequency-to-voltage conversion mainly used for a position sensorless motor, and more particularly to a method and a device which can make accurate positioning control of a motor when controlling by using a counter electromotive force produced in stator coils.

BACKGROUND ART

The brushless DC motor is often used in view of its long life and low noise for motor-driven devices and motor-driven mechanisms used in each field of industrial world. For example, the servomotor, the stepping motor and the like are conventionally used as a motor for positioning in order to reciprocate a printing head of an ink-jet printer.

The servomotor has a position sensor and a speed sensor to make positioning by close loop control. On the other hand, the stepping motor makes positioning by open loop control.

The servomotor can provide very accurate positioning control but requires a very accurate sensor and also complex control. Therefore, it has a drawback that its controlling device and the like cost high in manufacturing.

The stepping motor, on the other hand, does not use a sensor of any sorts to make the open loop control. Therefore, the controlling device and the like therefor do not involve a high cost in manufacturing, but there is a drawback that vibrations and noises are liable to occur in use. In this connection, Japanese Patent Application Laid-Open Publication No. Hei 10-52094 proposes a technology that vibrations and noises can be reduced when the stepping motor is driven in position sensorless close loop driving.

The stepping motor of position sensorless drive detects a rotation position of the rotor by virtue of a counter electromotive force produced in stator coils. Therefore, the rotation position of the rotor cannot be detected when the motor is stopped. When the motor is started, synchronized operation is made to excite the stator coils in synchronization with a position command pulse in the same way as the drive of an ordinary stepping motor, and when the counter electromotive force reaches a level sufficient to detect the rotation position of the rotor, the position sensorless operation takes over from the synchronized operation.

In the position control system of the position sensorless motor as shown in FIG. 8, upon receiving a deviation of the present position detected by a rotation position detector from a commanded position, a PI compensator so controls to bring the present position to agree with the commanded position to control the input into the motor.

Where the speed cannot be increased quickly because of a load on the motor, it is necessary to gradually increase a frequency of a position command pulse. In this case, the motor is rotated in synchronization with the position command pulse during the synchronized operation.

But, when the synchronized operation is changed to the position sensorless operation, the motor position agrees with the position command, and a deviation between them becomes "0". When the deviation is "0", the PI compensator has a settled result "0", and the motor has a drive voltage "0". Therefore, the motor speed drops. Then, the output level of the counter electromotive force produced in the stator coils drops, disabling the detection of the rotation position of the rotor. Consequently, there is a possibility that the position sensorless drive cannot be made, and out of synchronism may be caused because the position sensorless drive can not be made.

Even if the out of synchronism could be avoided, the speed is largely changed as shown in FIG. 9. Therefore, after shifting to the position sensorless operation, deviations are accumulated to cause vibrations in the system, and settling time becomes long.

Where the motor decelerates and stops, there may be a drawback that the counter electromotive force produced in the stator coils can not be detected because of the lowering of the motor speed, out of synchronism is caused, and it becomes impossible to stop the motor at the target position.

In view of the circumstances described above, a primary object of the present invention is to provide a method for controlling a position sensorless motor and a control device thereof which can securely drive even a position sensorless motor and stop it at a target position.

For example, an ink-jet printer injects ink to commanded positions while reciprocally moving a printing head to print characters and pictures on a sheet. And the motor for reciprocating the printing head is called a CR control motor, for which a hybrid type stepping motor is used, for example.

One example of a mechanical structure of such a conventional hybrid type stepping motor will be described with reference to FIG. 12 to FIG. 14.

This hybrid type stepping motor has an opening on top and bottom portions of a casing 201, bearings 202, 203 disposed in the openings and a rotation shaft 204 rotatably supported by the bearings 202, 203 as shown in FIG. 12.

A rotor 205 is mounted on the rotation shaft 204. The rotor 205 comprises a magnet 206 which is inserted into and fixed to the be rotation shaft 204, and rotor pole pieces 207, 208 which are inserted into the rotation shaft 204 and fixed to the top and bottom of the magnet 206. The magnet 206 is magnetized in a direction of thickness (axial direction), and the rotor pole pieces 207, 208 are formed of layered steel plates.

A stator 209 is concentrically disposed around the rotor 205, a plurality (six to nine) of stator pole pieces 210 are disposed at equal intervals on the side of the rotor 205 of the stator 209, and each of the stator pole pieces 210 and the rotor 205 are mutually opposed with a space having a predetermined width therebetween. And, a stator coil 211 is wound around the respective stator pole pieces 210.

A plurality (e.g., 6) of small tooth poles 210a are disposed on the leading end of each of the stator pole pieces 210 so to be arranged in right and left directions from the center as shown in FIG. 13 and FIG. 14. And, a large number (e.g., 36) of small tooth poles 207a are formed on the outer periphery of the rotor pole piece 207 as shown in FIG. 13 and FIG. 14. Similarly, a large number (e.g., 36) of small tooth poles 208a are formed on the outer periphery of the rotor pole piece 208 (see FIG. 14). The small tooth poles 207a of the rotor pole piece 207 and the small tooth poles 208a of the rotor pole piece 208 are arranged in a state displaced by a half pitch, namely arranged with a phase displaced by 180° in electrical angle from one another.

The stepping motor configured as described above has the rotor 205 rotated by switching an electric current flowed in the stator coils 211 in synchronization with the pulse input from the outside, and its positioning can be made readily, so that its control circuit can be configured with ease. And, the hybrid type stepping motor is suitable as a CR control motor because it can realize an electrically delicate step angle.

Such a stepping motor can have its control circuit configured readily, but an electric current is flowed through the stator coils regardless of the position of the rotor, different from a brushless DC motor or the like, therefore, uneven rotations and noises are caused due to vibrations caused in the rotor. And, in order to prevent the occurrence of out of synchronism, an electric current with an allowance with respect to a load is flowed to the stator coils, resulting in a drawback that the motor generates a large volume of heat.

It has been demanded to provide a method for controlling a stepping motor which can realize smooth rotations and a low noise level through the elimination of vibrations of the rotor. To smoothly rotate the rotor, it is necessary to detect a rotation position of the rotor and to flow an electric current to the stator coils with appropriate timing. To do so, an encoder can be disposed to readily detect a rotation position of the rotor. But, there are drawbacks that it requires a mounting space and an extra cost, and a magnet for the encoder can not be magnetized. Therefore, it is not practical to have an encoder. As a method for detecting a rotation position of the rotor, therefore, it is preferable to adopt a position sensorless method which utilizes a counter electromotive force produced in the stator coils.

On the other hand, in the hybrid type stepping motor, the small tooth poles $207a$ of the rotor pole piece $207$ and the small tooth poles $208a$ of the rotor pole piece $208$ are configured to have their phase $\theta1$ and phase $\theta2$ equal to each other as shown in FIG. 14. In FIG. 14, $\theta=\theta1+\theta2$ is 360° in electrical angle.

Since the rotor pole pieces $207$, $208$ have such a large number of small tooth poles $207a$, $208a$, namely 36 of them and are small in size, the phase angle $\theta1$ and the phase angle $\theta2$ may not be made equal to each other because of deviations in fabricating accuracy or assembling accuracy. In such a case, a magnetic flux density produced in the space between the rotor $205$ and the stator $209$ does not become a sine wave but misshaped as indicated by the solid line in FIG. 15(A). As a result, the counter electromotive force produced in the stator coils $211$ does not become a sine wave as indicated by the solid line in FIG. 15 (B). Thus, it was found that a period of a plus half cycle and a period of a minus half cycle did not become equal. In FIG. 15, waveforms indicated by the broken lines show a magnetic flux density and a counter electromotive force when $\theta1=\theta2$.

Therefore, when the position of the rotor is detected according to the counter electromotive force produced in the stator coils and the timing of flowing an electric current to the stator coils is determined according to the detection, the timing of flowing an electric current may become inappropriate due to deviations in the mechanical precision of the motor. And, such a drawback is desired to be solved.

Where the close loop control is conducted by the position sensorless method, the counter electromotive force produced in the stator coils is used to detect the rotational speed of the rotor as described above, and the speed control is made according to the detection. Therefore, there may also be a drawback that the control precision is lowered due to deviations in the mechanical precision of the rotor of the motor. And it is desired to solve such a drawback.

Accordingly, a second object of the present invention is to provide thereof a method for controlling a motor and a controlling device thereof that even when the rotor section of the motor has deviations in the mechanical precision, changeover timing of the energization of stator coils can be detected accurately, and the rotor can be rotated smoothly with a noise level lowered, and even if the rotor section of the motor has deviations in the mechanical precision, the precision of the close loop control can be prevented from lowering, and furthermore, even if the rotor section of the motor has deviations in the mechanical precision, the changeover timing of energization of the stator coils can be detected accurately and the precision of the close loop control can be prevented from lowering.

As described above, in order to control the motor, the position of the rotor is detected by detecting the counter electromotive force produced in the stator coils without using a sensor. But, when a star-connected motor makes the PWM control as a means for varying the motor speed, the counter electromotive force can be detected with ease because a voltage at a connecting point of stator coils of the motor (hereinafter called "the stator-coils-connecting-point-voltage") becomes about one half of the power voltage in the period that PWM is ON, but the detection becomes difficult in the period that PWM is OFF because the stator-coils-connecting-point voltage of the motor becomes a positive potential or negative potential of the motor applied voltage.

Therefore, when the PWM control is performed, it is necessary to detect the counter electromotive force after removing an influence of PWM.

To do this, there are proposed a method of processing a terminal voltage with a low pass filter, a method of detecting the counter electromotive force only when PWM is ON, and a method of stabilizing the midpoint voltage of the motor by simultaneously turning ON/OFF the positive and negative switching devices.

According to the aforesaid method using the low pass filter, the terminal voltage is passed through the low pass filter and delayed by 90 degrees. Therefore, it has an advantage that the commutation timing can be obtained without providing a separate delay circuit. But, a filter output waveform is deformed due to a spike voltage appearing in the motor terminal voltage immediately after the commutation. Therefore, there is a disadvantage that when the motor load is increased and the period in which the spike voltage is caused becomes long, the commutation cannot be made accurately.

The method which detects the counter electromotive force only when PWM is ON can accurately perform the commutation even if the motor load is increased, by prohibiting the detection of the counter electromotive force in the period that the spike voltage is caused and the period that the PWM is OFF. But, it has a disadvantage that the circuit scale becomes large because a circuit for prohibiting the detection of the counter electromotive force is required and a drawback that the detection is delayed if the PWM frequency is not high enough. Besides, there are drawbacks that the stator-coils-connecting-point voltage is varied largely while PWM is OFF, so that the voltage of the no exiting phase is also changed largely, and a resonance current flows between the output capacitance of the switching device and the motor coil, disabling the accurate detection of the counter electromotive force.

The method which turns ON/OFF the plus and minus switching devices simultaneously is described in, for example, Japanese Patent Application Laid-Open Publication No. Sho 59-172991 or No. Hei 2-20636. Japanese Patent Application Laid-Open Publication No. Sho 59-172991 processes a terminal voltage with the low pass filter and therefore has a problem that the commutation cannot be made accurately because of the increase of the motor load. And, Japanese Patent Application Laid-Open Publication No. Hei 2-20636 needs to input the stator-coils-connecting-point potential of the terminal voltage to the filter and therefore has a drawback that the motor cost increases because it is necessary to have a line to enter the stator-coils-connecting-point potential from the motor in addition to the problem of the increase in the motor load.

Accordingly, a third object of the present invention is to provide a motor drive device which can make accurate commutation without being affected by a change in the motor load or the PWM frequency.

A conventional motor control device for driving a motor is provided with a frequency-to-voltage conversion device which can obtain a DC voltage proportional to the frequency of an input signal in order to control the motor speed.

An example of such an analog type frequency-to-voltage conversion device comprises a one-shot multiple-vibrator 401 and an RC filter 402 consisting of a resistor R and a capacitor C as shown in FIG. 32.

In the frequency-to-voltage conversion device configured as described above, for example a pulse output from a motor rotation detector is converted into a duty ratio corresponding to the rotational speed by the one-shot multiple-vibrator 401 and smoothed by the RC filter 402. Thus, there is obtained a DC voltage as shown in the drawing.

But, the conventional frequency-to-voltage conversion device has a drawback that output is delayed because it has a filter element such as the RC filter 402 to reduce an output ripple.

When a high resolution encoder can be used as the aforesaid motor rotation detector, the delay of output can be decreased because the output ripple can be made small even by making a time constant of the RC filter 402 small.

But, when a position sensorless operation of a brushless DC motor for example is performed to make commutation by detecting the counter electromotive force produced in its stator coils, it is difficult to enhance the detection resolving power, so that it is necessary to increase a time constant of the RC filter 402 in order to decrease the output ripple of the conventional frequency-to-voltage conversion device. Therefore, when the conventional frequency-to-voltage conversion device is used for the position sensorless drive type motor to make the close loop control, there is a drawback that responsivity can not be improved due to an influence of the delay in output from the RC filter 402.

And, where the position sensorless drive is conducted, the counter electromotive force is not produced in the stator coils when the motor is not operating. Then, the position of the rotor cannot be detected. Accordingly, it is forced to make commutation by making the synchronized operation to start the motor, which is then accelerated until a detectable counter electromotive force is produced in the stator coils, and the shift to the position sensorless drive is made.

In a low speed rotation region before shifting to the position sensorless drive, the motor is driven in the synchronized operation, namely in an open loop, and the close loop control is not made. Thus, where the control is performed in a predetermined rotation range only or a controllable operation range is limited, the conventional frequency-to-voltage conversion device can provide power in a rotation range outside the necessary range. Therefore, it has drawbacks that there is a large volume of waste and a dynamic range of the frequency-to-voltage conversion output cannot be made wide.

Therefore, a fourth object of the invention is to provide a frequency-to-voltage conversion method and its device by which output is not delayed, linearity to the rotational speed in the output range can be secured, and a wide dynamic range can be obtained; and also a motor control device which serves to improve responsivity.

DISCLOSURE OF THE INVENTION

The present invention is a method for controlling a position sensorless motor which is provided with a synchronized operation and a position sensorless operation and has operation mode-switching means for switching between such operations, which comprises the steps of:

exciting stator coils of the motor in synchronization with a position command signal during the synchronized operation to rotate the rotor;

detecting a rotation position of the rotor based on counter electromotive forces produced in the stator coils during the position sensorless operation, exciting the stator coils in synchronization with the detected rotation position of the rotor to rotate the rotor, determining a deviation between a target position and the present position from a target rotation position and the detected rotation position according to the position command signal, and making a position sensorless close loop drive based on the determined deviation; and adding a predetermined bias to the deviation at the time of starting the position sensorless operation and then decreasing the bias.

The invention is also the method for controlling a position sensorless motor, wherein switching from the synchronized operation to the position sensorless operation is conducted under a condition that the counter electromotive forces produced in the stator coils have reached a predetermined level, and switching from the position sensorless operation to the synchronized operation is conducted under a condition that the deviation has become zero.

The invention is a device for controlling a position sensorless motor which is provided with a synchronized operation and a position sensorless operation and has an operation mode-switching means for switching between such operations, which comprises:

stator coil drive means which excites stator coils of the motor in synchronization with a position command signal when the synchronized operation is selected by the operation mode-switching means and, when the position sensorless operation is selected, detects the rotation position of the rotor based on counter electromotive forces produced in the stator coils, and excites the stator coils in synchronization with the detected rotation position of the rotor;

deviation calculation means which determines a deviation between a target position and the present position from the position command signal and the detected rotation position of the rotor when the position sensorless operation is selected by the operation mode-switching means;

control means which controls the drive of the stator coil drive means according to the deviation determined by the deviation calculation means when the position sensorless operation is selected by the operation mode-switching means; and bias control means which adds a predetermined bias to the deviation determined by the deviation calculation means immediately after the selection of the position sensorless operation by the operation mode-switching means and decreases the bias with a lapse of time.

And, the invention is the device for controlling a position sensorless motor, wherein the operation mode-switching means has frequency measuring means for measuring a frequency of the position command signal, switches from the synchronized operation to the position sensorless operation when a frequency of the position command signal exceeds a predetermined value, and switches the position sensorless operation to the synchronized operation when the deviation becomes zero.

The invention is also a method for controlling a position sensorless motor which is provided with a synchronized operation and a position sensorless operation and has an operation mode-switching means for switching between such operations, which comprises the steps of:

exciting stator coils of the motor in synchronization with a position command signal during the synchronized operation to rotate a rotor;

detecting a rotation position of the rotor based on counter electromotive forces produced in the stator coils during the position sensorless operation, exciting the stator coils in synchronization with a rotor rotation position signal indicating the detected rotation position of the rotor to rotate the rotor;

determining a deviation between a target position and the present position from a target rotation position and the detected rotation position of the rotor according to the position command signal, adding an integral value of the determined deviation to the deviation, determining a rotor rotational speed on the basis of the rotor rotation position signal, making position sensorless close loop drive on the basis of a value obtained by subtracting the rotor rotational speed from an added value of the deviation and the integral value of the deviation; and setting a predetermined initial value for the integral value of the deviation when the synchronized operation is switched to the position sensorless operation by the operation mode-switching means.

And, the invention is the method for controlling a position sensorless motor, wherein:

the operation mode-switching means has frequency measuring means for measuring a frequency of the position command signal; and the operation mode-switching means changes the operation mode to the position sensorless operation when a frequency of the position command signal or a counter electromotive force level exceeds a first predetermined value after starting the synchronized operation, and changes the position sensorless operation to the synchronized operation when the frequency of the position command signal or the counter electromotive force level becomes lower than a second predetermined value and the deviation is zero.

The invention is also a device for controlling a position sensorless motor which is provided with a synchronized operation and a position sensorless operation and has an operation mode-switching means for switching between such operations, which comprises:

stator coil drive means which excites stator coils of the motor in synchronization with a position command signal when the synchronized operation is selected by the operation mode-switching means and, when the position sensorless operation is selected, detects the rotation position of the rotor based on counter electromotive forces produced in the stator coils to excite the stator coils in synchronization with a rotor rotation position signal indicating the detected rotation position of the rotor;

deviation calculation means which determines a deviation between a target position and the present position from a target rotation position according to the position command signal and the detected rotation position of the rotor when the position sensorless operation is selected by the operation mode-switching means;

integration means for determining an integral value of the deviation determined by the deviation calculation means;

rotational speed detection means for determining a rotor rotational speed on the basis of the rotor rotation position signal;

control means which controls the drive of the stator coil drive means on the basis of a value obtained by adding an integral value of the deviation to the deviation and subtracting the rotor rotational speed from the added value of the deviation and the integral value of the deviation; and initial value setting means for setting a predetermined initial value as the integral value of the deviation by the integration means when the synchronized operation is changed to the position sensorless operation by means of the operation mode-switching means.

And the invention is the device for controlling a position sensorless motor, wherein the operation mode-switching means has frequency measuring means for measuring a frequency of the position command signal, changes the synchronized operation to the position sensorless operation when the frequency of the position command signal or a counter electromotive force level exceeds a first predetermined value, and changes the position sensorless operation to the synchronized operation when the frequency of the position command signal or the counter electromotive force level becomes lower than a second predetermined value and the deviation is zero.

The invention is also a method for controlling a motor which detects a moment of changing a counter electromotive force produced in stator coils of the motor from plus to minus or from minus to plus, decides changeover timing of energizing the stator coils by adding a delay time with reference to the respective detected moments, and flows an electric current to the stator coils on the basis of the decided changeover timing of energization to rotate the rotor, characterized in that the delay time is a measuring time which is among measuring times obtained by measuring a time between the respective detected moments and corresponds to a positive or negative period of the counter electromotive forces.

And the invention is the method for controlling a position sensorless motor, wherein the delay time is a time obtained by sequentially measured times between the respective detected moments and using the time which is the time measured earlier by one immediately before the decision of the changeover time for energization.

The invention is also a device for controlling a position sensorless motor, which comprises:

position detection means for producing a rotor position signal indicating a rotation position of a rotor by comparing counter electromotive forces produced in stator coils of the motor with a predetermined voltage;

clocking means for detecting a moment of change in the rotor position signal produced by the position detection means and measuring a time between the detected moments of changes;

energization changeover timing decision means which adds a delay time with reference to the moments of changes detected by the clocking means to decide the energization changeover timing of the stator coils and uses as the delay time the measured time corresponding to the positive and negative periods of the counter electromotive forces among the measured times by the clocking means; and exciting means for flowing an electric current to the stator coils with the energization changeover timing decided by the energization changeover timing decision means.

And the invention is the device for controlling a position sensorless motor, wherein:

the clocking means sequentially detects rising and falling edges of the rotor position signal produced by the position detection means and sequentially measures a time between the detected edges; and the energization changeover timing decision means, when respective edges are detected by the clocking means, decides the energization changeover timing of the stator coils by adding a delay time with reference to the respective moments of detection and uses as the delay time the time which is the time measured earlier by one immediately before the decision of the energization changeover timing by means of the clocking means.

The invention is also a method for controlling a position sensorless motor which detects a position of a rotor by virtue of counter electromotive forces produced in stator coils of the motor and rotates the rotor by flowing an electric current to the stator coils on the basis of the detected position, characterized in that:

a moment of change of the counter electromotive force from plus to minus or from minus to plus is detected, a time between the detected moments of change is measured, a rotational speed of the rotor is determined from the average of two times corresponding to the plus and minus periods of the counter electromotive force among the measured times, and close loop control is performed according to the determined rotational speed.

The invention is also a method for controlling a position sensorless motor which detects a position of a rotor by virtue of counter electromotive forces produced in stator coils of the motor and rotates the rotor by flowing an electric current to the stator coils on the basis of the detected position, characterized in that:

a moment of change of the counter electromotive force from plus to minus or from minus to plus is detected, a time between the detected moments of change is measured, a rotational speed of the rotor is determined at the every moment of change from the average of the last measured time and the measured time before last, and close loop control is made according to the determined rotational speed.

The invention is also a device for controlling a motor, which comprises:

position detection means for producing a rotor position signal indicating a rotation position of a rotor by comparing counter electromotive forces produced in stator coils of the motor with a predetermined voltage;

exciting means for flowing an electric current to the stator coils on the basis of the rotor position signal produced by the position detection means;

rotational speed detection means which sequentially detects a moment of the change from the rotor position signal produced by the position detection means, measures a time between the detected moments of the change, and determines a rotational speed of the rotor from the average of the two times corresponding to the plus and minus periods of the counter electromotive forces among the measured times; and control means for controlling the exciting means so to have the rotational speed determined by the rotational speed detection means agreed with a target value.

The invention is also a device for controlling a position sensorless motor, which comprising:

position detection means for producing a rotor position signal indicating a rotation position of a rotor by comparing counter electromotive forces produced in stator coils of the motor with a predetermined voltage;

clocking means which detects a moment of change of the rotor position signal produced by the position detection means and measures a time between the detected moments of change;

energization changeover timing decision means which adds a delay time with reference to the moments of change detected by the clocking means to decide the energization changeover timing of the stator coils and uses as the delay time the time corresponding to the plus and minus periods of the counter electromotive forces among the times measured by the clocking means;

exciting means for flowing an electric current to the stator coils with the energization changeover timing decided by the energization changeover timing decision means;

rotational speed detection means which determines the rotational speed of the rotor from the average of the two times corresponding to the plus and minus periods of the counter electromotive forces among the times measured by the clocking means; and control means for controlling the exciting means so to have the rotational speed determined by the rotational speed detection means agreed with a target value.

The invention is also a device for controlling a position sensorless motor used for a motor having its rotor rotated by causing commutation in star-connected stator coils, comprising an inverter circuit which includes plus side switching devices and minus side switching devices to supply a power voltage to the stator coils, a counter electromotive force detection circuit for detecting counter electromotive forces of the stator coils, and a control circuit for controlling the inverter circuit on the basis of output from the counter electromotive force detection circuit; the control circuit having a PWM circuit which emits a PWM signal, and plus side switching devices and minus side switching devices of the inverter circuit being simultaneously turned ON/OFF according to the PWM signal, wherein:

the counter electromotive force detection circuit is provided with a comparator, and makes the terminal voltages of the stator coil pulsed by inputting the terminal voltages of the stator coils into the comparator directly or after dividing and also inputting the power voltage after dividing, and the terminal voltages of the stator coils and the power voltage are determined to have a voltage division ratio of 2 to 1.

And the invention is the device for controlling a position sensorless motor, wherein the comparator of the counter electromotive force detection circuit has the terminal voltage of the stator coil inputted after divining into ($\frac{1}{2}$) and the power voltage inputted after dividing into ($\frac{1}{4}$).

And the invention is a device for controlling a brushless DC motor, wherein the control circuit has a commutation signal transmission circuit which produces a pulse for causing commutation in the stator coils on the basis of the terminal voltage of the stator coils pulsed by the comparator, and the commutation signal transmission circuit prohibits the detection of the terminal voltage of the stator coils immediately after the commutation.

The invention is also a frequency-to-voltage conversion method which is provided on a rotation control device and generates a predetermined output signal according to an input signal, which comprises the steps of:

fixing a value of the output signal to a predetermined value when the rotational speed determined based on the input signal is not more than a predetermined value, and generating the value of the output signal in proportion to the rotational speed when the rotational speed is not less than the predetermined value.

The invention is also a frequency-to-voltage conversion method which is provided on a rotation control device and generates a predetermined output voltage according to an input signal, which comprises the steps of:

fixing the output voltage to a minimum value when the rotational speed determined based on the input signal is not more than a predetermined value; and allocating the output voltage in proportion to the rotational speed within its output range when the rotational speed is in a range not less than the predetermined value.

The invention is also a frequency-to-voltage conversion device, which comprises:

counting means which inputs an input signal from a rotation detector and counts pulses of a predetermined frequency over one cycle of the input signal; and voltage generation means which fixes an output voltage to a minimum value when a rotational speed corresponding to the counted value by the counting means is not more than a predetermined value and generates the output voltage in proportion to the rotational speed within the output range when the rotational speed is in a range of not less than the predetermined value.

And the invention is the frequency-to-voltage conversion device, wherein the voltage generation means comprises a conversion table in which the counted value by the counting means and its corresponding output voltage are stored in advance.

The invention is also a motor control device, which comprises:

rotor position signal generation means which generates a rotor position signal indicating a rotation position of a rotor on the basis of a counter electromotive force produced in stator coils of a motor;

exciting means for energizing the stator coils on the basis of the rotor position signal generated by the rotor position signal generation means; and control means for controlling the energization of the exciting means so to follow the rotations of the rotor according to the command; wherein:

the control means has counting means for counting pulses of a predetermined frequency over one cycle of a signal related to the rotations of the rotor generated on the basis of the rotor position signal, and voltage generation means which fixes the output voltage to a minimum value when the rotational speed corresponding to the counted value of the counting means is not more than a predetermined value and generates the output voltage in proportion to the rotational speed within the output range when the rotational speed is in a range of not less than the predetermined value.

And the invention is the motor control device, wherein the voltage generation means comprises a conversion table in which the counted value of the counting means and its corresponding output voltage are stored in advance.

And the invention is the motor control device, wherein the motor is a three-phase hybrid type stepping motor.

The invention is the motor control device, wherein the motor is to be used to drive at least one of a printer head carriage and a printer paper-feeding mechanism.

BEST MODE FOR CARRYING OUT THE INVENTION

Figure 1:
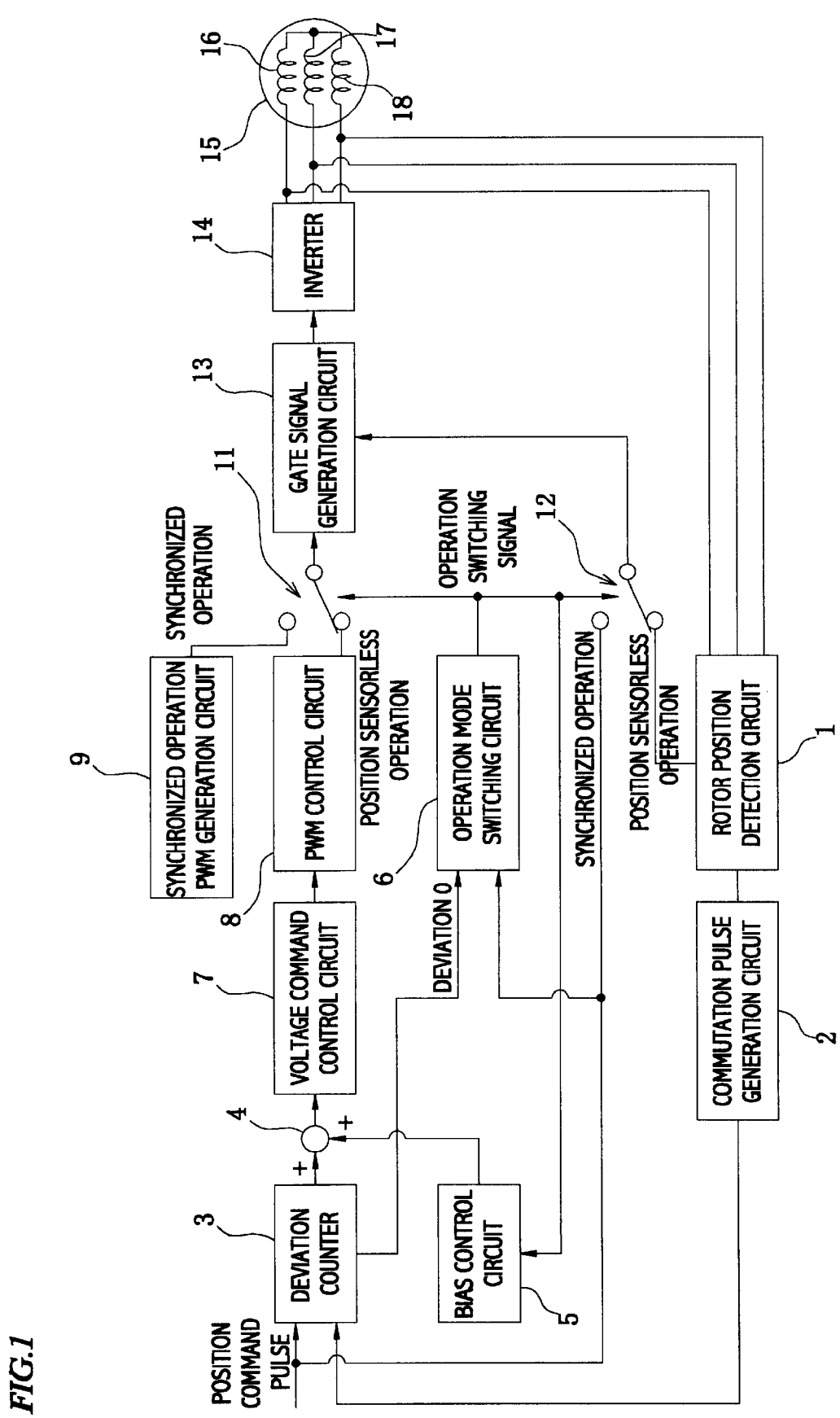
FIGS. 1 is a block diagram showing an example of a structure of a motor control device according to an embodiment of the present invention.

FIG. 1 is a block diagram showing an example of a structure of a motor control device where the present invention is applied to a three-phase hybrid type stepping motor. The three-phase hybrid type stepping motor driven and controlled by a motor control device is used to drive, for example, a head carriage and a paper-feed mechanism of a printer, which are connected as a load to the rotation shaft of the motor.

The motor control device according to this embodiment has a rotor position detection circuit 1, a commutation pulse generation circuit 2, a deviation counter 3, an adder 4, a bias control circuit 5, an operation mode-switching circuit 6, a voltage command control circuit 7, a PWM control circuit 8, a synchronized operation PWM generation circuit 9, operation changeover switches 11, 12, a gate signal generation circuit 13, and an inverter 14 for driving a three-phase hybrid type stepping motor 15 as shown in FIG. 1. And this motor control device is configured to make synchronized operation and position sensorless operation by switching the operation changeover switches 11, 12 as described afterward.

The detailed structure of the respective portions of the motor control device will be described with reference to the drawings.

The rotor position detection circuit 1 is configured to take in respective counter electromotive forces produced in three star-connected stator coils 16, 17, 18 during the position sensorless operation, to produce a rotor position signal indicating a rotation position of the rotor on the basis of the respective counter electromotive forces, to produce on the basis of the rotor position signal a commutation timing signal indicating commutation timing of an exciting current to be supplied to the stator coils 16, 17, 18, and to output the commutation timing signal to the gate signal generation circuit 13 through the operation changeover switch 12.

The commutation pulse generation circuit 2 is configured to produce a single pulse every time when the rotor rotates at one step angle on the basis of the rotor position signal produced by the rotor position detection circuit 1 and to output the produced pulse to the deviation counter 3.

The deviation counter 3 is configured so that in the position sensorless operation a position command pulse (position command signal) from outside and the pulse from the commutation pulse generation circuit 2 are respectively counted, a deviation between a target position and the current position is determined from a difference between the counted values, and a deviation voltage corresponding to the determined deviation is output to the adder 4. Here, the position command pulse includes rotation position information of the rotor and rotational speed information of the rotor. The rotation position information is given in a total number of pulses, and the rotational speed information is given in a frequency of pulse.

The adder 4 is configured to add a deviation voltage output from the deviation counter 3 and a bias voltage output from the bias control circuit 5 and to output the added voltage to the voltage command control circuit 7.

It is configured that when the synchronized operation is shifted to the position sensorless operation according to the operation switching signal from the operation mode-switching circuit 6, the bias control circuit 5 outputs a predetermined bias voltage to the adder 4 when the position sensorless operation is started and decreases a value of the bias voltage with a lapse of time. The bias voltage value is appropriately selected depending on the conditions of the motor 15 and its load.

The operation mode-switching circuit 6 is configured to produce an operation switching signal for switching from the synchronized operation to the position sensorless operation when the frequency of the position command pulse reaches a predetermined value, namely the counter electromotive forces produced in the stator coils 16, 17, 18 of the motor 15 reach a sufficient level, and for switching from the position sensorless operation to the synchronized operation when a deviation of the deviation counter 3 becomes "zero". And, respective contacts of the operation changeover switches 11, 12 are switched to either of the synchronized operation side or the position sensorless operation side according to the operation switching signal, and the operation switching signal is output to the bias control circuit 5.

Upon receiving the output voltage from the adder 4, the voltage command control circuit 7 makes command control so that the PWM control circuit 8 produces a PWM (pulse width modulation) signal according to the output voltage.

Based on the command from the voltage command control circuit 7, the PWM control circuit 8 produces a PWM signal according to the output voltage from the adder 4 and outputs the PWM signal to the gate signal generation circuit 13 via the operation changeover switch 11.

The synchronized operation PWM generation circuit 9 generates a PWM signal to be used in the synchronized operation and outputs the PWM signal to the gate signal generation circuit 13 via the operation changeover switch 11.

In the synchronized operation, the gate signal generation circuit 13 generates a gate signal for flowing an exciting current to the stator coils 16, 17, 18 of the motor in synchronization with the position command pulse from the outside. In the position sensorless operation, the gate signal generation circuit 13 generates a gate signal to flow an exciting current to the stator coils 16, 17, 18 of the motor in synchronization with the commutation timing signal from the rotor position detection circuit 1.

The inverter 14 comprises a three-phase bridge circuit having unillustrated six switching transistors. And the stator coils 16, 17, 18 of the motor 15 are connected to output terminals of the inverter 14. Therefore, the transistors of the inverter 14 have the passage of electric current through them controlled by the gate signal generated by the gate signal generation circuit 13, so that an exciting current flows through the stator coils 16, 17, 18.

Figure 2:
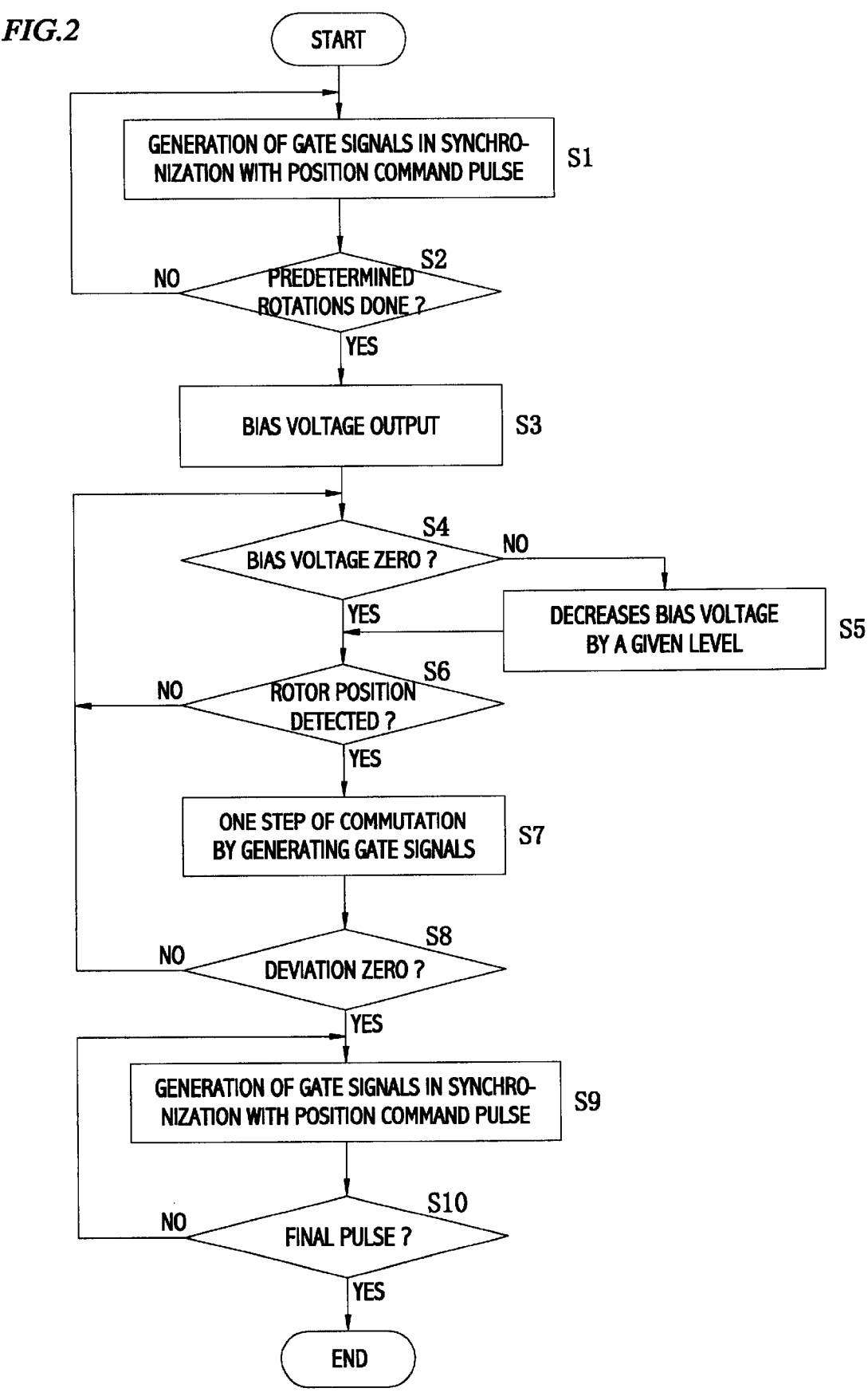
FIG. 2 is a flowchart illustrating an example of operation of respective portions of the motor control device.
Figure 3:
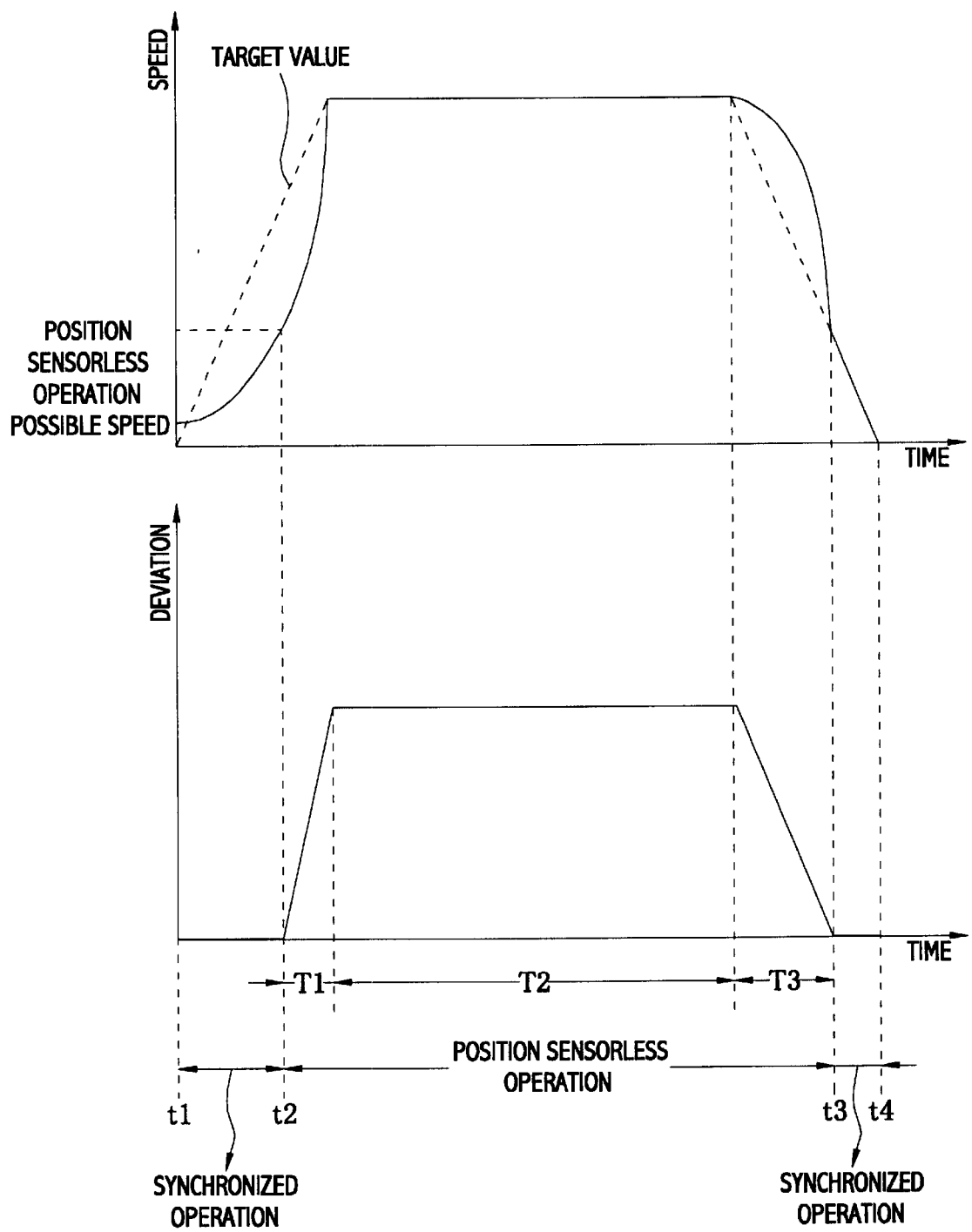
FIG. 3 is a diagram illustrating an example of operation pattern according to the motor control device.

Now, one example of the operation of the motor control device of this embodiment described above will be described with reference to FIG. 1 to FIG. 3. FIG. 2 is a flowchart showing an example of the operation of the motor control device. FIG. 3 is an explanatory diagram illustrating an operation pattern of the motor control device, wherein the solid line among speed curves shown at the upper portion indicates an actual speed of the motor, and the solid broken line indicates its target value.

As shown in FIG. 3, the motor control device performs the synchronized operation and the position sensorless operation (position sensorless close-loop driving operation) and automatically switches from the synchronized operation to the position sensorless operation and vice versa.

The synchronized operation and the position sensorless operation will be described in detail.

Where the motor 15 is started at time t1 as shown in FIG. 3, the operation switching signal to be output from the operation mode-switching circuit 6 has for example level "L" to perform the synchronized operation, so that the changeover contacts of the operation changeover switches 11, 12 are positioned on the synchronized operation side (on the side opposite from the one shown in FIG. 1). Therefore, the gate signal generation circuit 13 in the synchronized operation drives the inverter 14 to make commutation in synchronization with the position command pulse from the outside (step S1). In other words, the gate signal generation circuit 13 produces the gate signal in synchronization with the position command pulse. And the inverter 14 is activated by the gate signal to flow an exciting current to the stator coils 16, 17, 18.

At time t2, the operation mode-switching circuit 6 judges on the basis of the frequency of the position command pulse that the motor 15 has reached a predetermined rotation (step S2), and the operation switching signal output from the operation mode-switching circuit 6 is changed from level "L" to level "H". And, the changeover contacts of the operation changeover switches 11, 12 are switched to the position sensorless operation side (the position as shown in FIG. 1) to shift to the position sensorless operation.

At time t2, the switching signal being supplied from the operation mode-switching circuit 6 to the bias control circuit 5 is changed from level "L" to level "H", and the bias control circuit 5 outputs a predetermined bias voltage to the adder 4 (step S3). At this time, only the bias voltage is supplied from the bias control circuit 5 to the voltage command control circuit 7, and the PWM control circuit 8 produces a PWM signal according to the bias voltage. The PWM signal is supplied to the gate signal generation circuit 13 to secure the rotations of the motor 15.

Thus, the predetermined bias voltage is output to the adder 4 for the following reason. At time t2, a deviation of the deviation counter 3 is "0", and an output deviation voltage of the deviation counter 3 output to the adder 4 is "0", so that this control system controls to stop the motor 15. In this situation, an output level of the counter electromotive forces produced in the stator coils 16, 17, 18 of the motor 15 lowers, disabling the detection of the position of the rotor, and out of synchronism is caused as a result. Accordingly, it is designed to add a bias voltage to a manipulated variable when the shift to the position sensorless operation is started so to prevent the occurrence of out of synchronism when the operation is shifted to the position sensorless operation.

After shifting to the position sensorless operation as described above, when the bias voltage output from the bias control circuit 5 is not "0" (step S4: No), the bias voltage is decreased in a constant amount (step S5). The bias voltage is decreased as described above, because when the bias voltage remains even if the deviation counter 3 has a deviation of "0", the motor 15 is driven to a position forwarded from the instructed position.

During the position sensorless operation, the rotor position detection circuit 1 produces a commutation timing signal indicating the commutation timing of the stator coils 16, 17, 18 and outputs it to the gate signal generation circuit 13. Thus, the gate signal generation circuit 13 produces a gate signal in synchronization with the commutation timing signal. The inverter 14 is driven according to the gate signal to flow an exciting current to the stator coils 16, 17, 18.

Furthermore, during the position sensorless operation, the commutation pulse generation circuit 2 produces one pulse as the rotor turns by a single step angle and outputs the produced pulse to the deviation counter 3. Therefore, the deviation counter 3 counts the position command pulse and the pulse from the commutation pulse generation circuit 2 to determine a deviation of the position and outputs a deviation voltage corresponding to the deviation to the adder 4.

Therefore, during the position sensorless operation shown in FIG. 3, every time when the rotor position detection circuit 1 detects the position of the rotor as shown in steps S6 to S8 of FIG. 2, the detection signal is output to the gate signal generation circuit 13 to produce a gate signal in synchronization with the detection signal, and the inverter 14 is driven according to the gate signal to flow an electric current to the stator coils 16, 17, 18. This procedure is repeated until a deviation of the deviation counter 3 becomes "zero"

In the position sensorless operation, the motor is accelerated in a state of being delayed than the position command, because of inertia, during acceleration period T1 shown in FIG. 3. Therefore, the deviation of the deviation counter 3 is accumulated during the acceleration operation period T1 as shown in FIG. 3, but the deviation does not change but remains accumulated during constant operation period T2. On the other hand, the motor decelerates with delay with respect to the position command in deceleration operation period T3 shown in FIG. 3, so that the deviation of the deviation counter 3 decreases as shown in FIG. 3. Accordingly, when the deviation becomes "zero", the position sensorless operation is switched to the synchronized operation, and the motor rotor can be stopped at a position (target position) after its predetermined rotation.

When the operation mode-switching circuit 6 judges that the deviation from the deviation counter 3 has become "zero" at time t3 as shown in FIG. 3 (step S8: Yes), the operation changeover switches 11, 12 are switched to the synchronized operation side, and the same synchronized operation as described above is performed (steps S9, S10).

And, when the final position command pulse is supplied to the gate signal generation circuit 13 at time t4 as shown in FIG. 3 (step 10: Yes), the motor stops at the target position.

As described above, the motor control device of this embodiment can perform the synchronized operation and the position sensorless operation. The bias voltage from the bias control circuit 5 is output to the adder 4 at the start of the position sensorless operation, so that even if the deviation voltage output from the deviation counter 3 is "zero" then, the shift to the position sensorless operation can be made smoothly without causing the motor to have out of synchronism.

The motor control device of this embodiment is designed to shift the position sensorless operation to the synchronized operation when the deviation of the deviation counter 3 becomes "zero", so that the motor can be stopped at the target position.

The operation mode-switching means corresponds to the operation mode-switching circuit 6 and the operation changeover switches 11, 12 shown in FIG. 1, the exciting means corresponds to the rotor position detection circuit 1, the gate signal generation circuit 13 and the inverter 14, the deviation calculation means corresponds to the deviation counter 3, the control means corresponds to the adder 4, the voltage command control circuit 7 and the PWM control circuit 8, and the bias control means corresponds to the bias control circuit 5.

Now, another embodiment of the present invention will be described.

Figure 4:
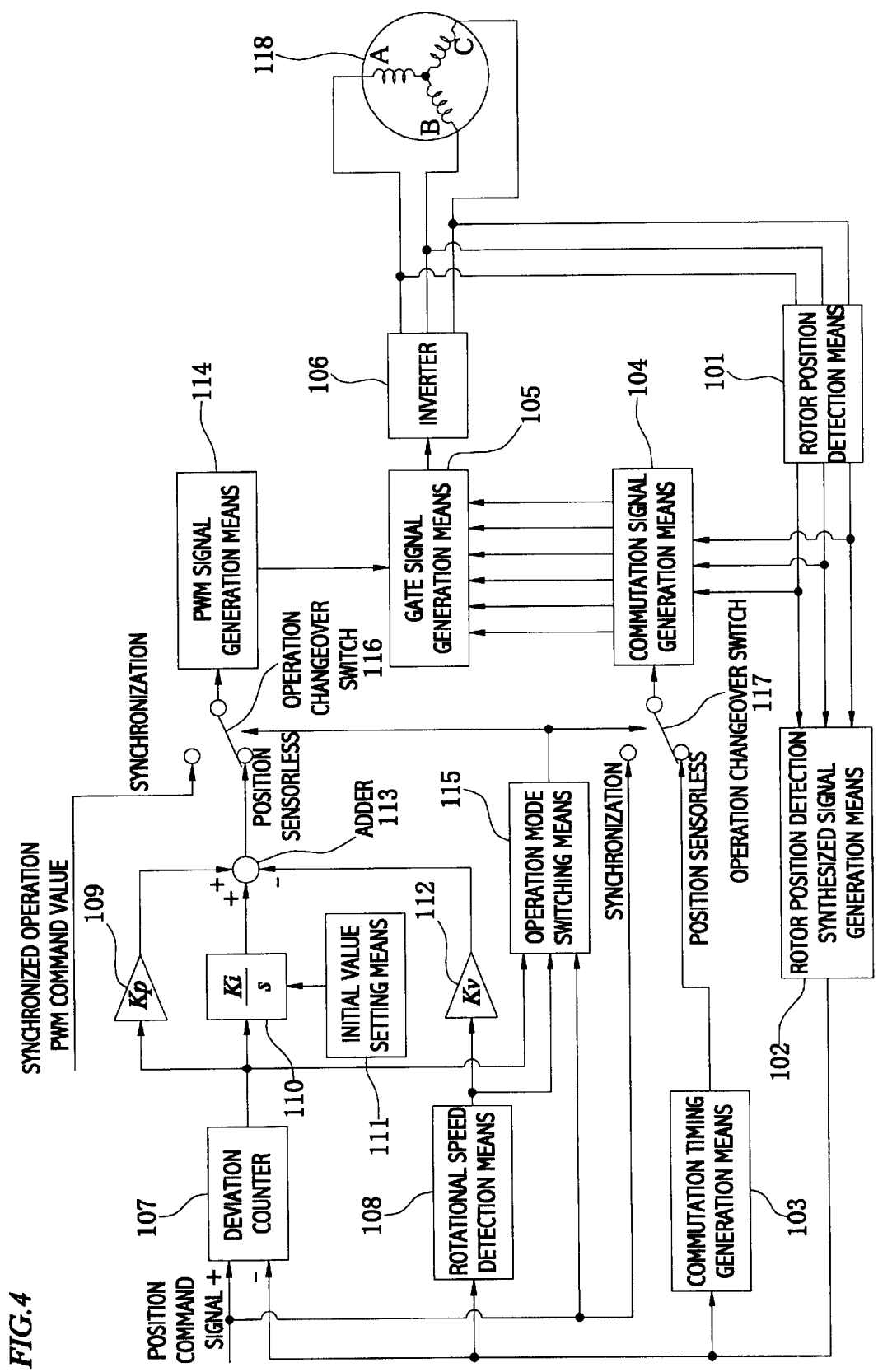
FIG. 4 is a block diagram showing an example of a structure of the motor control device according to an embodiment of the invention.

FIG. 4 is a block diagram showing an example of another structure of the motor control device where the present invention is applied to a three-phase hybrid type stepping motor. The three-phase hybrid type stepping motor driven and controlled by the motor control device is used to drive a head carriage and a paper-feed mechanism of a printer as described in the previous embodiment, which are connected as a load to the rotation shaft of the motor.

The motor control device of this embodiment has rotor position detection means 101, rotor position detection synthesized signal generation means 102, commutation timing generation means 103, commutation signal generation means 104, gate signal generation means 105, an inverter 106, a deviation counter 107, rotational speed detection means 108, a proportional gain 109, integration means 110, initial value setting means 111, a speed gain 112, an adder 113, PWM signal generation means 114, operation mode-switching means 115, and operation changeover switches 116, 117 as shown in FIG. 4. And this motor control device is configured to make a synchronized operation and a position sensorless operation of a three-phase hybrid type stepping motor 118 by switching the operation changeover switches 116, 117.

The detailed structure of the respective portions of the motor control device will be described.

The rotor position detection means 101 takes in respective counter electromotive forces produced in three star-connected stator coils A, B, C in the position sensorless operation, and generates rotor position signals indicating the rotation position of the rotor on the basis of the counter electromotive forces. The rotor position detection synthesized signal generation means 102 generates a rotor position detection synthesized signal which is synthesized from the rotor position signals.

The commutation timing generation means 103 generates commutation timing in view of the position of the rotor obtained by the rotor position detection synthesized signal generation means 102. When the detected position of the rotor has a phase forwarded from the commutation timing, the phase is delayed by a necessary amount.

The commutation signal generation means 104 selects a combination of stator coils to be commutated next in view of the rotor position signals for three phases produced by the rotor position detection means 101 and produces a commutation signal in synchronization with the commutation timing signal produced by the commutation timing generation means 103.

The gate signal generation means 105 overlays a PWM signal generated by the PWM signal generation means 114 to be described afterward on the commutation signal produced by the commutation signal generation means 104 to produce a gate signal for driving the inverter 106.

The inverter 106 comprises a three-phase bridge circuit having unillustrated six switching devices. And stator coils A, B, C of the motor are connected to output terminals of the inverter 106. The switching devices of the inverter 106 have the passage of electric current through them controlled by the gate signal generated by the gate signal generation means 105, so that an exciting current flows through the stator coils A, B, C.

In the position sensorless operation, the deviation counter 107 is configured to respectively count a position command pulse (position command signal) from outside and a pulse from the rotor position detection synthesized signal generation means 102 and output a difference between the counted values as a deviation between a commanded position (target position) and the current position. The position command signal is given as a pulse train so that the number of pulses indicates a moved distance and the frequency of pulse indicates a rotational speed.

The rotational speed detection means 108 measures a cycle of the rotor position detection synthesized signal produced by the rotor position detection synthesized signal generation means 102 to detect a rotational speed of the motor.

The proportional gain 109 multiplies a positional deviation output from the deviation counter 107 by Kp, and the integration means 110 integrates the positional deviation output from the deviation counter 107 with gain Ki.

The initial value setting means 111 sets the initial value possessed by the integration means 110 to the integration means when the synchronized operation is shifted to the position sensorless operation, and the initial value is determined according to the motor and its loaded conditions so that an optimum transient response can be obtained.

The speed gain 112 multiplies the detected rotational speed of the rotor by Kv, and the adder 113 outputs a calculated result of {(output of the proportional gain 109)+(output of the integration means 110)−(output of the speed gain 112)}.

The PWM signal generation means 114 produces a PWM signal having a duty ratio corresponding to the output value from the adder 113.

The operation mode-switching means 115 is configured to produce an operation mode-switching signal for switching the operation mode from the synchronized operation to the position sensorless operation and vice versa. And, respective contacts of the operation changeover switches 116, 117 are shifted to either of the synchronized operation side or the position sensorless operation side depending to the operation mode-switching signal. Besides, the operation mode-switching means 115 has means for measuring a frequency of the position command signal in order to determine the switching timing.

The operation mode-switching means 115 has the following switching timing.

The synchronized operation is shifted to the position sensorless operation when a frequency of the position command signal or a level of the counter electromotive force exceeds a first predetermined value after starting the synchronized operation.

And the position sensorless operation shifts to the synchronized operation when a frequency of the position command signal or a level of the counter electromotive force becomes lower than a second predetermined value and the deviation is zero.

The predetermined frequency here is set to a value capable of detecting the counter electromotive force, namely a value higher than the frequency corresponding to a minimum rotational speed at which the position sensorless rotation can be performed.

Figure 5:
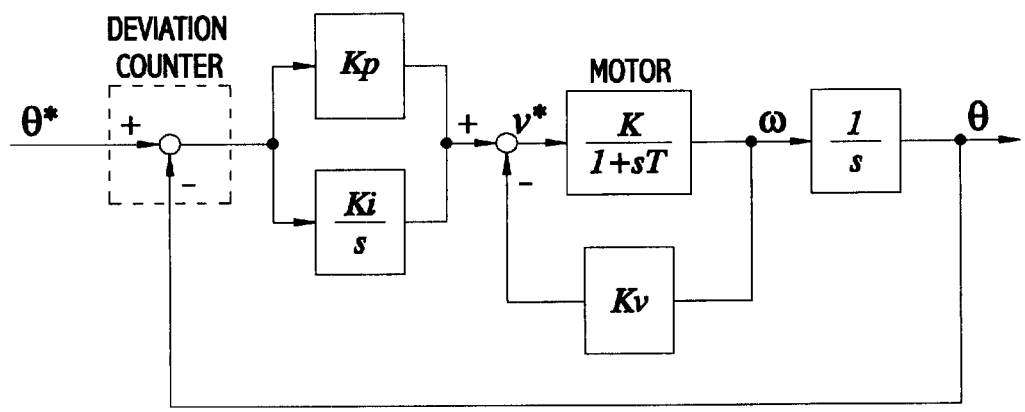
FIG. 5 is a block diagram showing a PI position control system to which a speed minor loop compensation is added.

As shown in FIG. 5, this embodiment adds speed minor loop compensation to a PI position control system to make the speed minor loop control with respect to the deviation in the position sensorless operation. In other words, the deviation counter 107 counts the position command signal and the rotor position detection signal in the position sensorless operation, outputs a deviation between the commanded position and the present position, and performs the PI control in view of the deviation via the proportional gain 109 and the integration means 110.

Thus, by adding the speed minor loop compensation to the PI position control system to make control, input to the motor is controlled so that a rotation phase of the motor is agreed with a phase of the position command signal, namely the positional deviation is always zero. Therefore, precise position control and speed control can be realized with respect to the position command signal.

Figure 6:
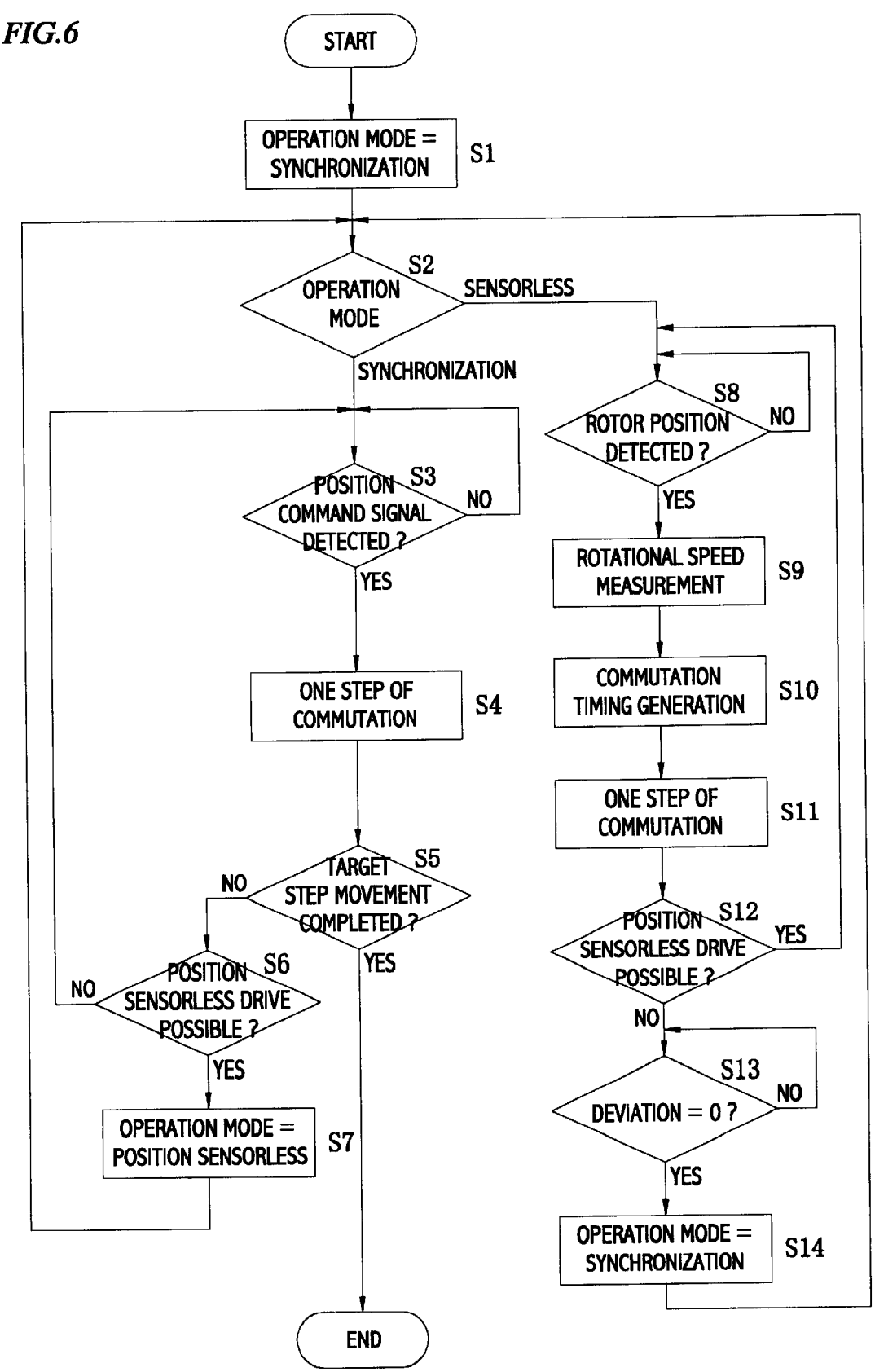
FIG. 6 is a flowchart illustrating an example of operation of respective portions of the motor control device.
Figure 7:
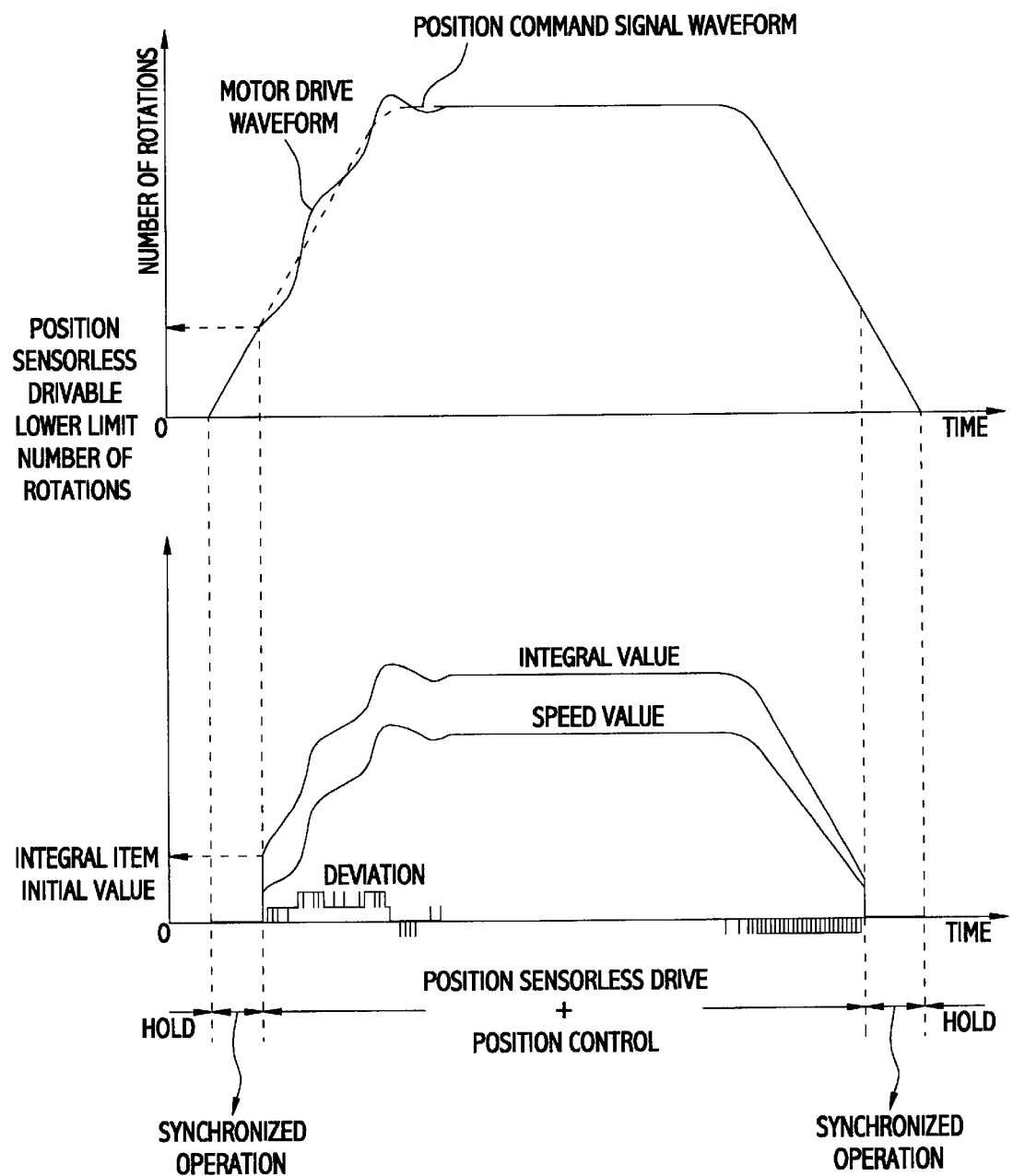
FIG. 7 is a diagram illustrating an example of operation pattern according to the motor control device.
Figure 8:
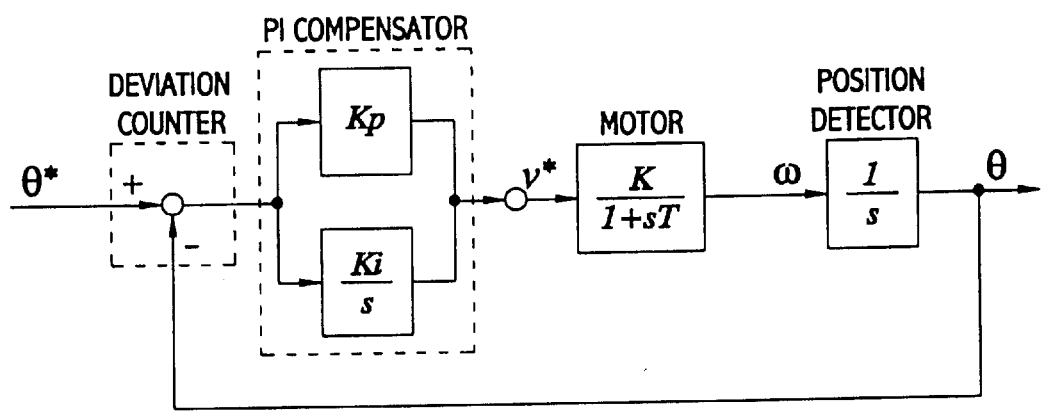
FIG. 8 is a block diagram showing a PI position control system.
Figure 9:
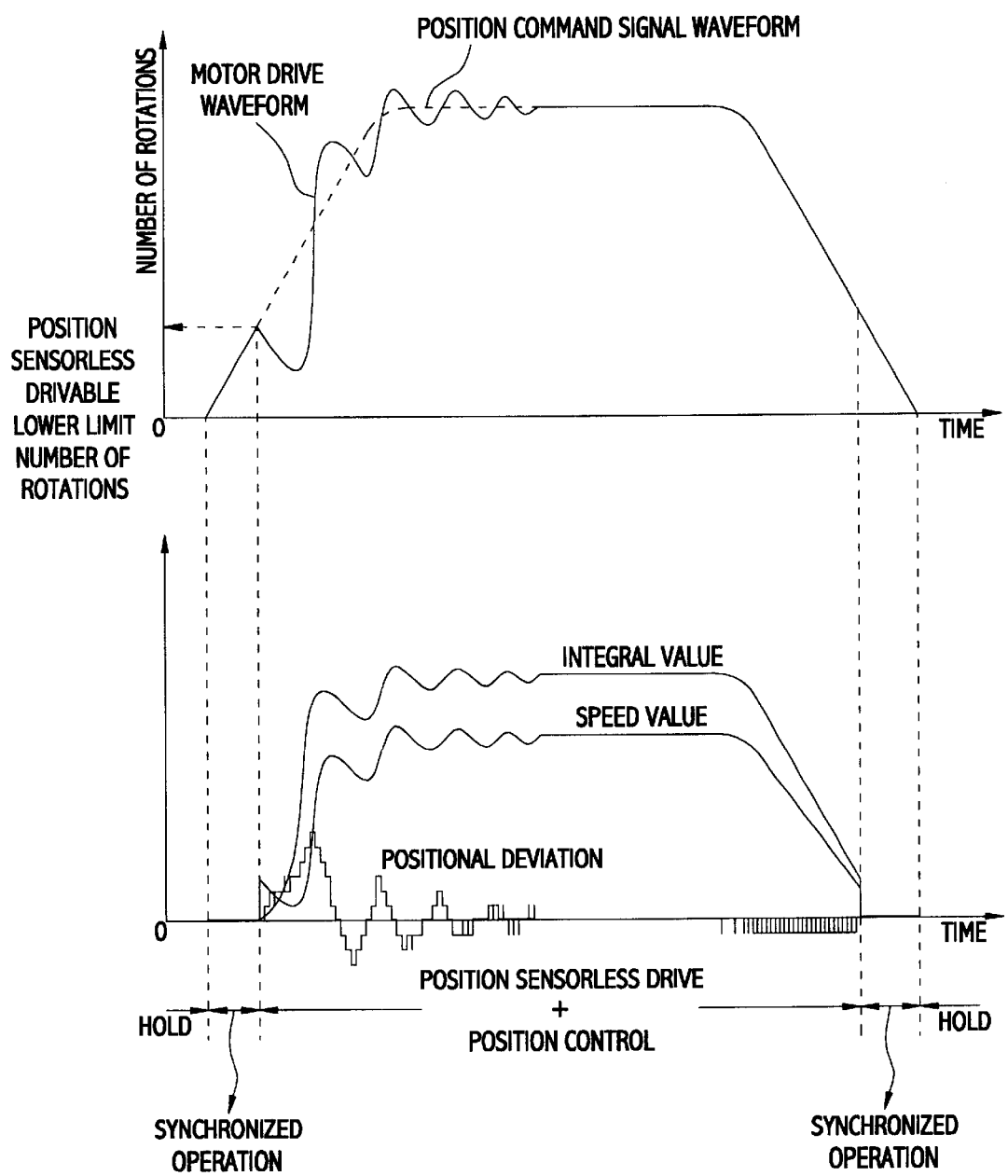
FIG. 9 is a diagram illustrating an example of operation pattern according to the motor control device.

Details of the synchronized operation and the position sensorless operation of this embodiment will be described with reference to FIG. 6. FIG. 7 is an explanatory diagram illustrating an operation pattern of the motor control device, in which the solid line among the speed curves shown at the upper section indicates an actual speed of the motor, and the solid broken line indicates its target value.

This motor control device switches automatically from the synchronized operation to the position sensorless operation and vice versa.

When the motor is activated, the operation mode-switching means 115 sets the operation mode to the synchronized operation (step S1), and the signal of the synchronized operation output is level "L" for example. Thus, the changeover contacts of the operation changeover switches 116, 117 are shifted to the synchronized operation side (step S2). Accordingly, the PWM signal for the synchronized operation is selected during the synchronized operation, and commutation is performed in synchronization with the position command pulse (steps S3 and S4).

When the frequency of the position command signal exceeds a first predetermined value (step S6), namely the counter electromotive forces produced in the stator coils reach a detectable level to enable the position sensorless operation, the operation mode-switching means 115 sets the operation mode to the position sensorless operation (step S7), the operation switching signal is changed from level "L" to level "H", and the changeover contacts of the operation changeover switches 116, 117 are shifted to the position sensorless operation side (step S2) so to shift to the position sensorless operation.

During the position sensorless operation, as indicated by steps S8 to S11, the commutation timing generation means 103 produces commutation timing every time when the rotor position detection means 101 detects the rotor position, and commutation is performed in synchronization with the commutation timing.

The aforesaid commutation sequence is continued while the position sensorless operation is possible, and the speed minor loop compensation is added to the PI position control system to make control, so that accurate position control and speed control are realized with respect to the position command signal.

When the motor is decelerated and the frequency of the position command signal becomes lower than a second predetermined value (step S12), the operation mode-switching means 115 confirms that a deviation is "zero" (step S13) and sets the operation mode to the synchronized operation (step S14). The changeover contacts of the operation changeover switches 116, 117 are switched again to the synchronized operation side (step S2), the synchronized operation is continued to the final position command pulse (step S5), and the motor is stopped at the target position.

The speed minor loop control suppresses the gain at the high-speed rotation and improves a dumping property. In other words, it has an effect that proportional gain Kp is output as it is because a feedback amount of the speed minor loop is small at a low-speed rotation, but the proportional gain Kp is made small because the feedback amount is increased at a high-speed rotation. Accordingly, the proportional gain Kp can be made large by adding the speed minor loop, so that the dumping property, which makes the system non-oscillatory while securing responsivity, can be enhanced.

Besides, since this embodiment gives a predetermined initial value to the integration means 110, the adder 113 outputs an integration initial value even if a deviation is zero when the operation is shifted to the position sensorless operation. Thus, a change in voltage applied to the motor is suppressed, and out of synchronism can be prevented.

The integration initial value is set to a value so that an optimum transient response can be obtained depending on a load and a rotational speed. Thus, by setting the integration initial value to the optimum value, the synchronized operation can be shifted to the position sensorless position smoothly as shown in FIG. 7. Thus, out of synchronism can be prevented. And, an integration item is mainly in charge of acceleration after shifting, so that accumulation of the deviation is decreased. Therefore, the operation can always be made with the deviation in the vicinity of zero, and settling time can be made short.

As described above, according to the motor control method and its apparatus of this embodiment, the phase synchronization control with position deviation zero, namely the position control, can be made in the position sensorless operation, the motor can be driven with low noise and low consumption of power while maintaining positioning accuracy, and when the synchronized operation is shifted to the position sensorless operation as described above, pulling out of synchronism can be prevented, and settling time can be made short.

Now, another embodiment of the invention will be described.

Figure 10:
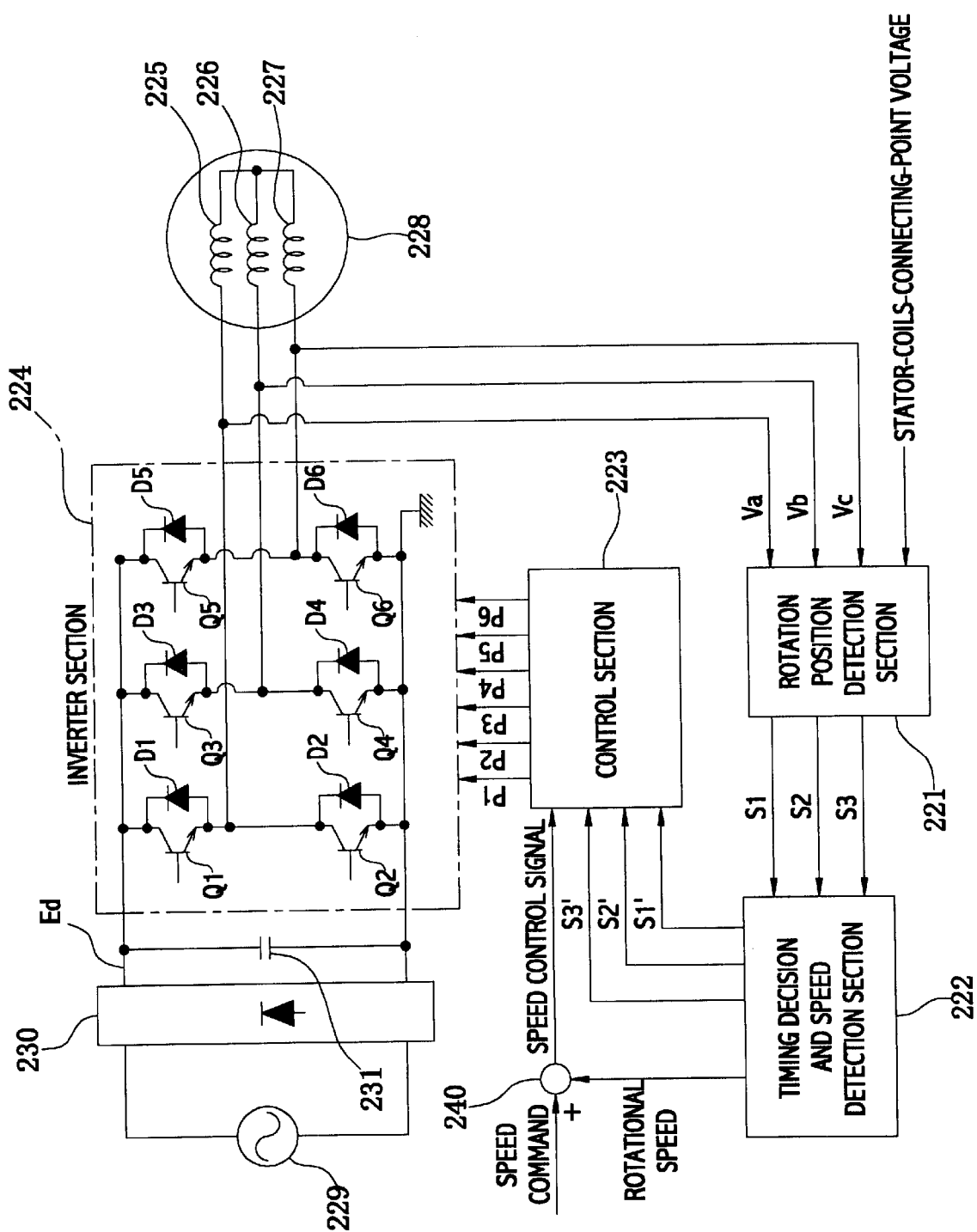
FIG. 10 is a block diagram showing an example of the motor control device according to an embodiment of the invention.
Figure 12:
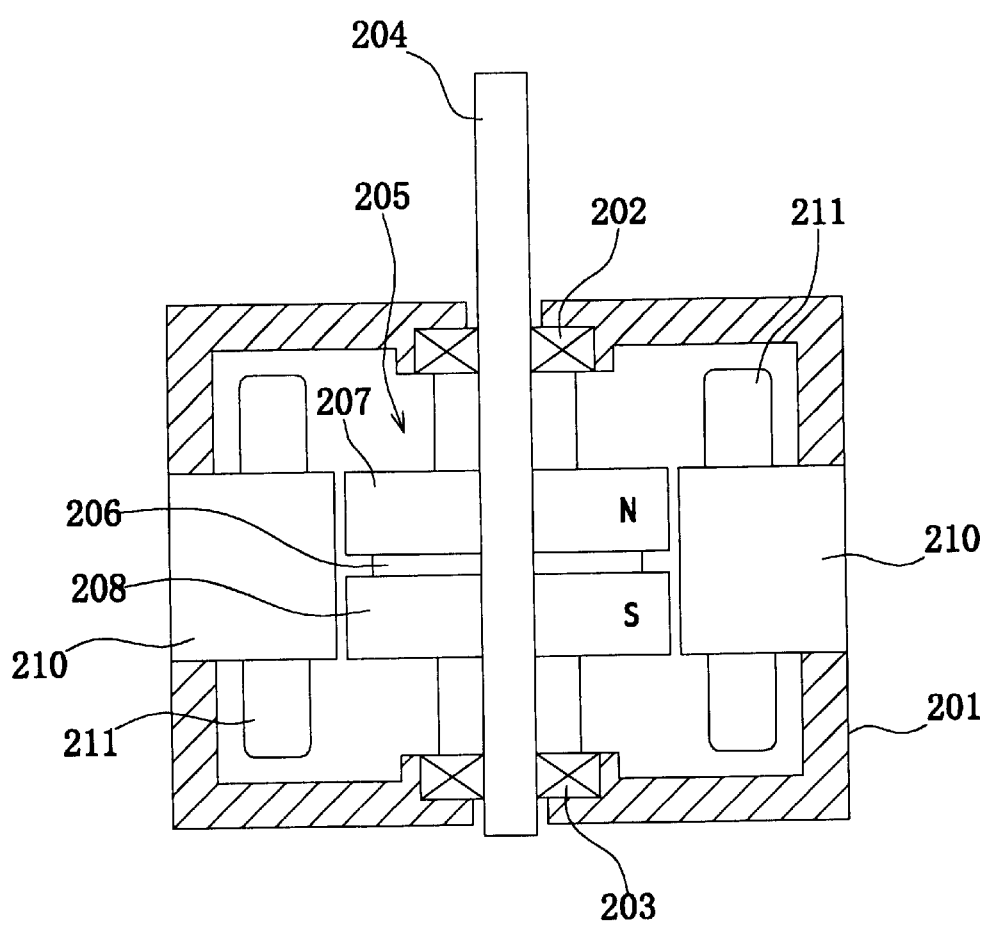
FIG. 12 is a sectional view showing a mechanical structure of a conventional stepping motor.
Figure 13:
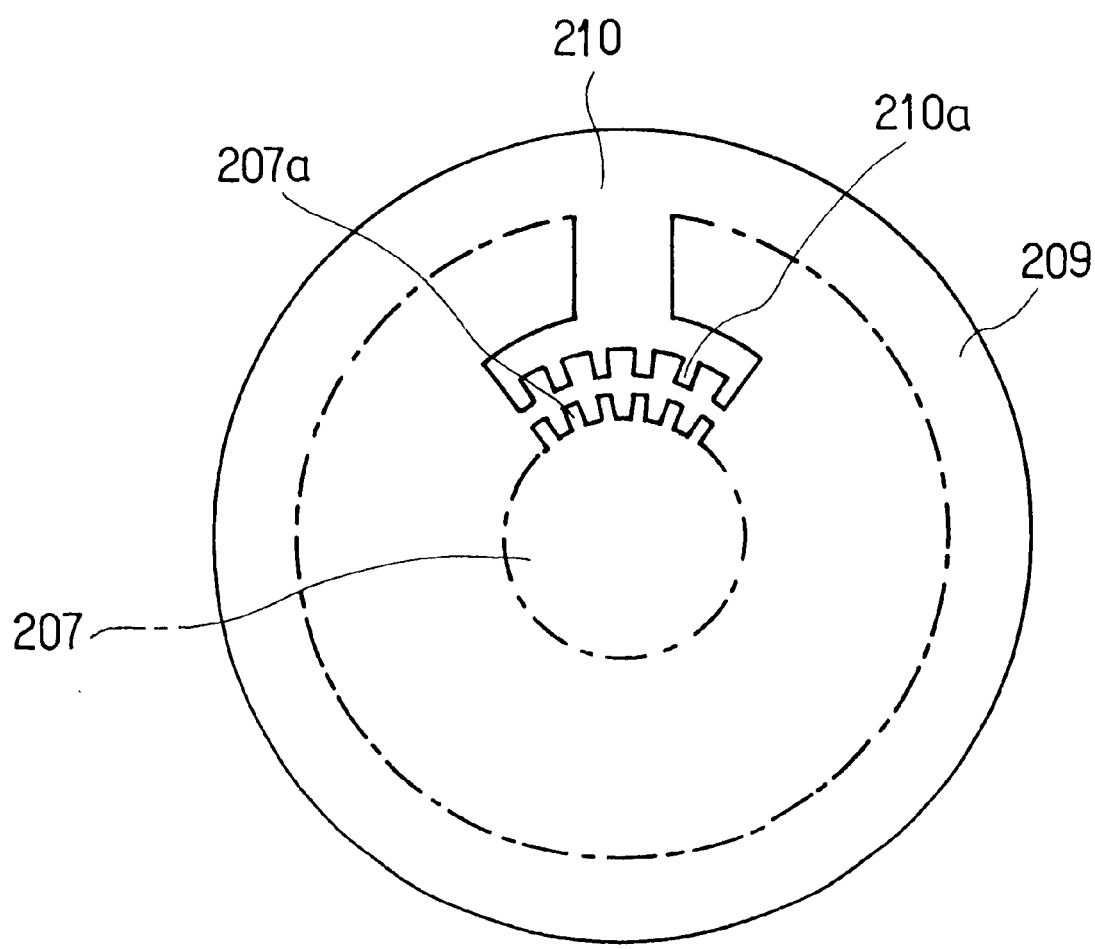
FIG. 13 is a plan view showing a relation between a rotor and a stator of the same stepping motor.

FIG. 10 is a block diagram showing an example of the structure of the motor control device of the present invention which is applied to a three-phase hybrid type stepping motor as shown in FIG. 12.

The motor control device of this embodiment has a rotation position detecting section 221, a timing decision and speed detecting section 222, an adder 240, a control section 223, and an inverter section 224 as shown in FIG. 10 and is configured to excite star-connected stator coils 225 to 227 of a three-phase hybrid type stepping motor 228 in a predetermined exciting pattern with a predetermined commutation timing as described afterward.

It is configured that the rotation position detecting section 221 takes in respective terminal voltages Va to Vc of the stator coils 225 to 227 when the motor 228 is rotated, compares the terminal voltages Va to Vc with a predetermined voltage such as a stator-coils-connecting-point voltage of the motor or a voltage in ½ of output DC voltage Ed of a rectifier 230, generates rotor position signals S1 to S3 indicating the rotation positions of the rotor, and outputs the generated rotor position signals S1 to S3 to the timing decision and speed detecting section 222. Therefore, the rotation position detecting section 221 comprises three unshown comparators and the like.

The timing decision and speed detecting section 222 detects given rising and falling edges when the rotor position signals S1 to S3 supplied from the rotation position detecting section 221 are changed, measures a time between the detected moments of changes by means of a counter, outputs energization changeover timing signals S1' to S3' indicating energization changeover timing of the stator coils 225 to 227 on the basis of the measured time and uses the measured time to determine a rotational speed of the rotor. Details of the signal processing will be described afterward. Therefore, the timing decision and speed detecting section 222 comprises a plurality of counters or timers.

The adder 240 produces a speed control signal based on a rotational speed from the timing decision and speed detecting section 222 and a speed command from the outside and outputs the produced speed control signal to the control section 223.

The control section 223 outputs energization signals P1 to P6 for controlling ON/OFF of transistors Q1 to Q6 of the inverter section 224 for exciting the stator coils 225 to 227 on the basis of the speed control signal from the adder 240 and a predetermined exciting method (e.g., two-phase exciting). And, the energization changeover timing (commutation timing) is determined on the basis of the energization changeover timing signals S1' to S3' output from the timing decision and speed detecting section 222. And, the energization signals P1 to P6 are supplied from the control section 223 to respective bases of the transistors Q1 to Q6 of the inverter section 224.

The inverter section 224 comprises a three-phase bridge circuit consisting of the switching transistors Q1 to Q6, and the stator coils 225 to 227 of the motor are connected to output terminals of the bridge circuit. Transistors Q1 to Q6 have diodes D1 to D6 connected in parallel thereto. The inverter section 224 is supplied with a DC voltage, which is obtained by rectifying an AC voltage from an AC power source 229 by the rectifier 230. And, a smoothing capacitor 231 for smoothing the output from the rectifier 230 is connected in parallel with output terminals of the rectifier 230.

Now, an example of the operation of the motor control device of this embodiment configured as described above will be described with reference to FIG. 10 and FIG. 11.

Until the motor 228 reaches a predetermined number of rotations from its stopped state, a counter electromotive force capable of specifying the rotor position cannot be obtained in the stator coils 225 to 227. Accordingly, when the motor is started, the control section 223 controls to output the energization signals P1 to P6 to excite the respective stator coils 225 to 227 in a predetermined order. The transistors Q1 to Q6 of the inverter section 224 are electrically conducted according to the energization signals P1 to P6, and the stator coils 225 to 227 are excited sequentially. Thus, the rotor makes synchronized rotations in a so-called open loop in accordance with the exciting.

Thus, when the motor is started, the exciting time of the exciting pattern is sufficient to apply power to the respective stator coils 225 to 227 so to activate the motor and gradually shortens the exciting time to increase the rotational speed of the rotor. When the rotational speed of the rotor reaches a sufficient level, the counter electromotive forces capable of specifying the rotation position of the rotor are produced in the stator coils 225 to 227, and terminal voltages Va to Vc are obtained.

Figure 11:
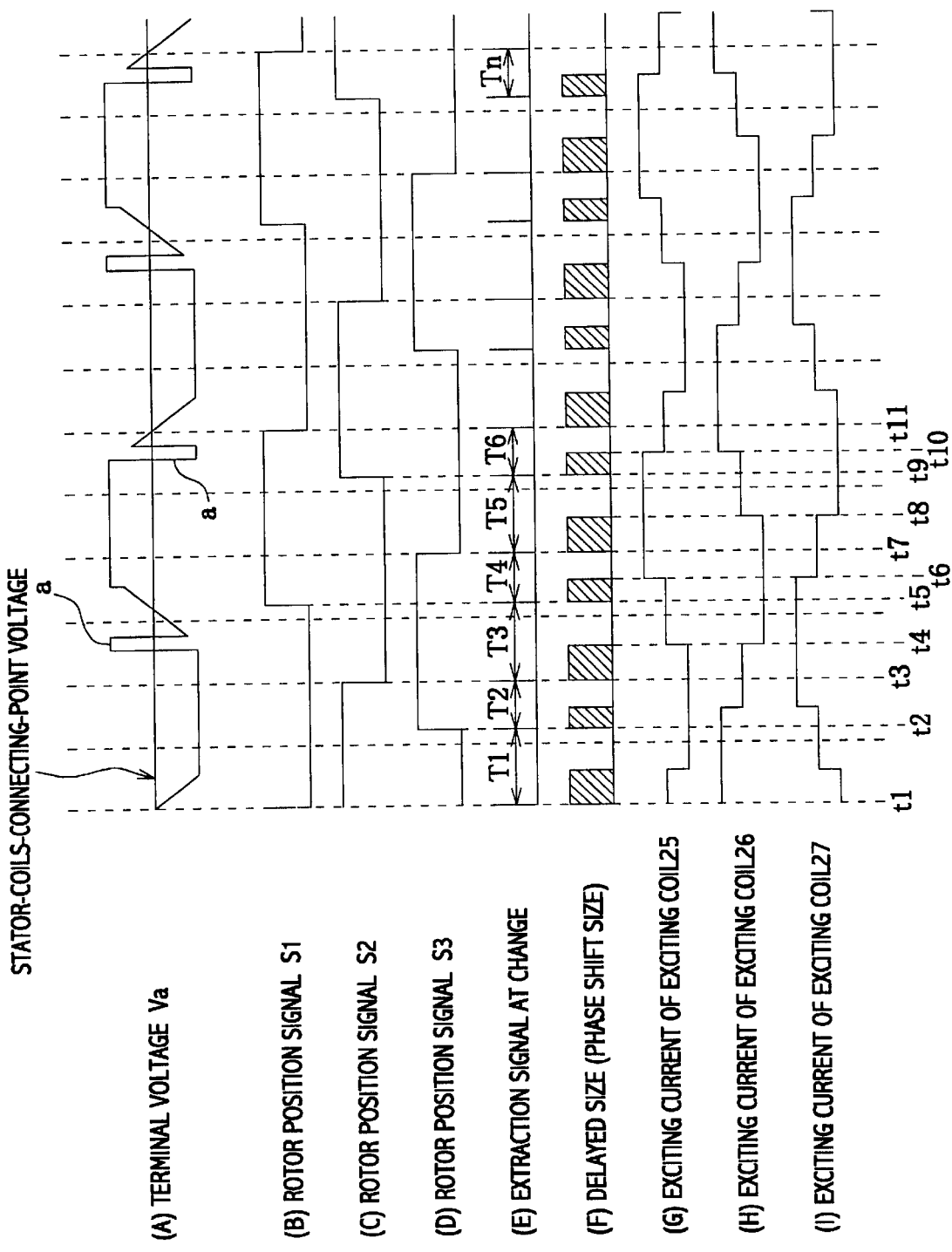
FIG. 11 is a waveform diagram showing examples of operation waveforms of respective portions of the same motor control device.
Figure 14:
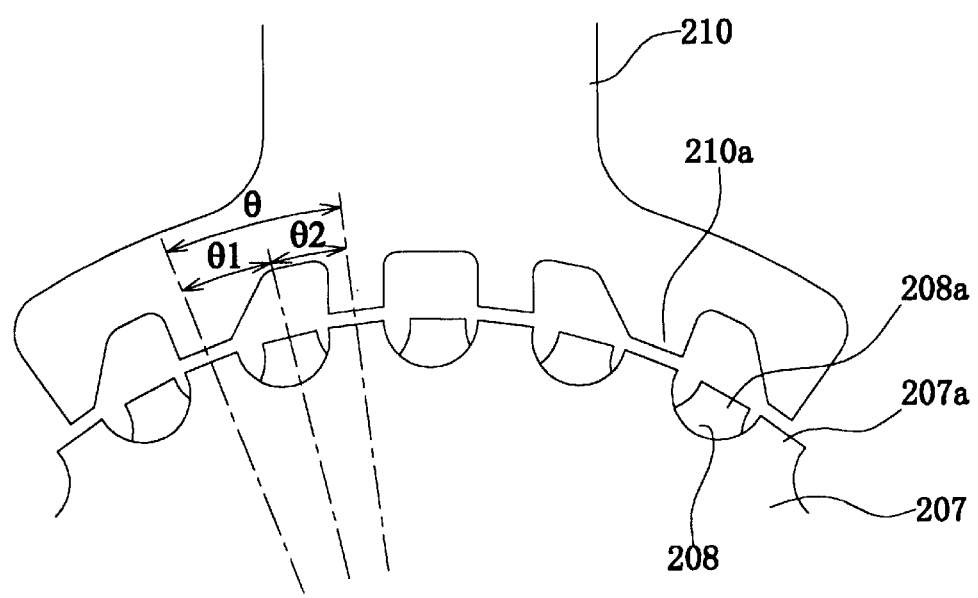
FIG. 14 is an enlarged view showing an essential part of the rotor and the stator of the same stepping motor.
Figure 15:
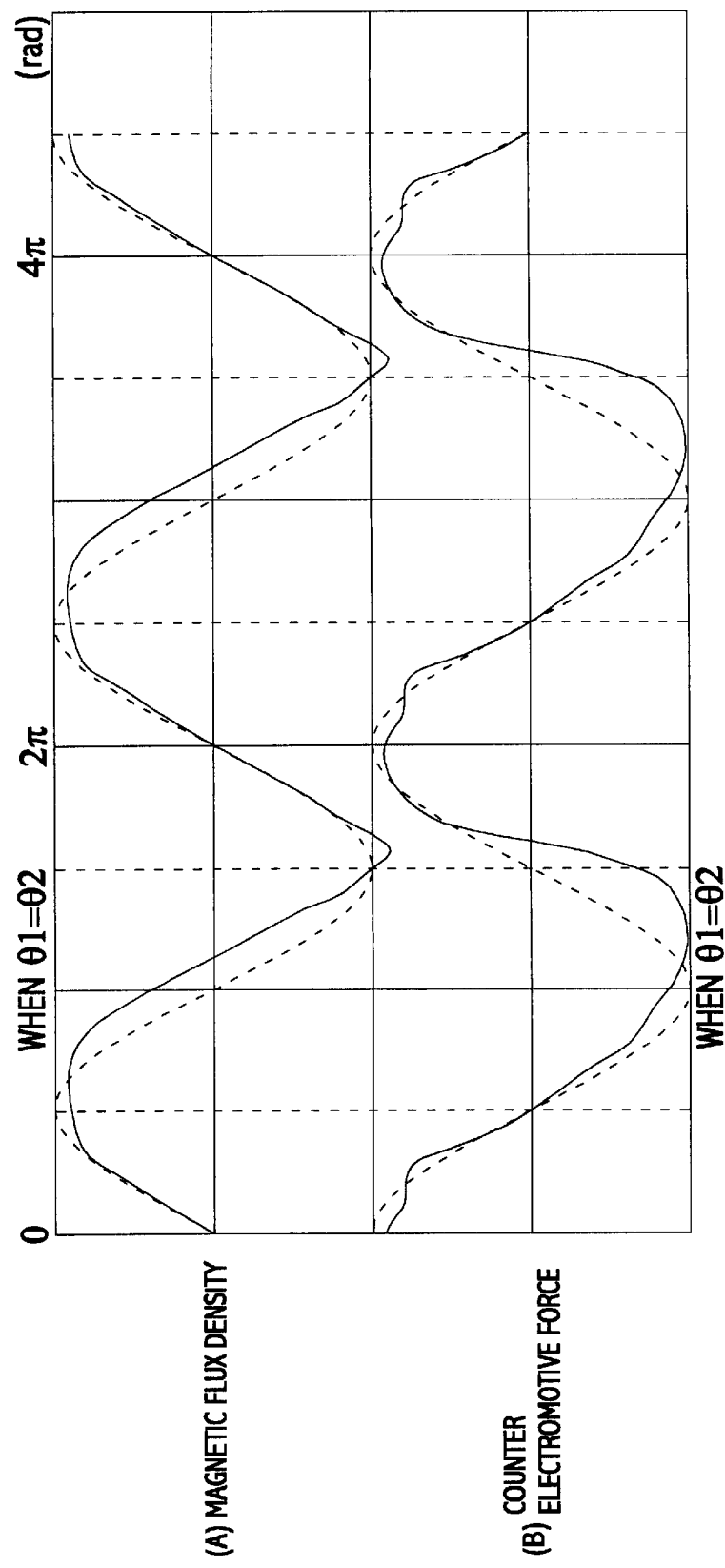
FIG. 15 is a diagram showing an example of a magnetic flux produced in the space between the rotor and the stator and a counter electromotive force produced in a stator coil.

As one example of the terminal voltages Va to Vc, the terminal voltage Va of the stator coil 225 is shown in FIG. 11(A). The other terminal voltages Vb, Vc are not shown and different in phase by 120° as compared with the terminal voltage Va but have the same waveform. And, the waveform of the terminal voltage Va has a difference in length between positive and negative periods as shown in FIG. 11 (A) because phases θ1 and θ2 are different from each other as shown in FIG. 14.

The respective terminal voltages Va to Vc are compared with for example a stator-coils-connecting-point voltage of the motor 228 by unillustrated three comparators in the rotation position detecting section 221, and an output which becomes level "H" when the terminal voltages Va to Vc exceed the stator-coils-connecting-point voltage is obtained from the respective comparators. But, since a spike voltage (a) transiently produced at the commutation is included in the respective terminal voltages Va to Vc as shown in FIG. 11(A), the output of the respective comparators cannot be used as it is as the rotor position signal indicating the rotation position of the rotor. Therefore, the rotation position detecting section 221 eliminates an influence due to the spike voltage (a) among the outputs from the comparators by an appropriate means such as a mask. Accordingly, the rotation position detecting section 221 outputs the rotor position signals S1 to S3 indicating the rotation positions of the rotor as shown in FIGS. 11(B), (C), (D).

Here, the respective rising and falling edges of the rotor position signals S1 to S3 correspond to the moments when the terminal voltages Va to Vc of the corresponding stator coils 225 to 227 change from positive to negative or negative to positive (see FIG. 11(A)).

The timing decision and speed detecting section 222 detects sequentially the moments when the rotor position signals S1 to S3 supplied from the rotation position detecting section 221 change, namely the respective rising and falling edges of the rotor position signals S1 to S3, sequentially determines time of periods T1, T2 . . . Tn between the detected edges (see FIG. 11(E)), and outputs, based on the determined time, energization changeover timing signals S1' to S3' for deciding the energization changeover timing (commutation timing) of the stator coils 225 to 227. Details of the signal processing by the timing decision and speed detecting section 222 will be described below.

When the falling edge of the rotor position signal S1 is detected at time t1, an unillustrated first counter capable of counting up and down starts to count from time t1. The counting operation by the first counter is conducted over period T1 from time t1 to time t2 when the rising edge of the rotor position signal S3 is detected and terminates at time t2. The period T1 corresponds to 60° in electrical angle.

Then, an unillustrated second counter capable of making up and down counting starts to count from the time t2, the counting operation by the second counter is conducted over period T2 from the time t2 to time t3 when the falling edge of the rotor position signal S2 is detected and terminates the counting operation at the time t3. The period T2 corresponds to 60° in electrical angle. Here, the period T1 and the period T2 have a different length, because the positive and negative periods of the terminal voltages Va to Vc produced in the stator coils 225 to 227 are different and this difference is reflected as described above.

It is preferable that energization changeover timing (commutation timing) of the stator coils 225 to 227 is determined to be a moment of shifting of 30° in electrical angle with reference to the times t1, t2, t3 . . . when the respective edges of the rotor position signals S1 to S3 are detected so to efficiently control the motor 228.

Therefore, at the time t3, the first counter starts to downcount the counted value counted during the period T1 and outputs to the control section 223 the energization changeover timing signal at time t4 when the counted value becomes ½ (corresponding to 30° in electrical angle). Shaded sections in FIG. 11(F) indicate a delayed amount (delay time) corresponding to 30° in electrical angle.

From the time t3, a third counter (not shown) capable of making up and down counting starts the counting operation. The counting operation by the third counter is conducted over period T3 from the time t3 to time t5 when the rising edge of the rotor position signal S1 is detected and terminated at time t5.

At the time t5, the second counter starts to down-count the counted value obtained by counting over the period T2 and outputs an energization changeover timing signal at time t6 when the counted value becomes ½ (corresponding to 30° in electrical angle). And, a fourth counter (not shown) capable of making up and down counting starts to make the counting operation from the time t5, the counting operation by the fourth counter is conducted over period T4 from the time t5 to time t7 when the falling edge of the rotor position signal S3 is detected and terminated at the time t7.

Similarly, while the first counter performs the counting operation over the period T5, the third counter outputs the energization changeover timing signal at time t8 by down-counting of the counted value. And, while the second counter counts over the period T6, the fourth counter outputs the energization changeover timing signal at time t10 by down-counting of the counted value. Therefore, when the timing decision and speed detecting section 222 produces an energization changeover timing signal in a predetermined period, it uses not the value counted by the counter in the period immediately before the predetermined period but the value counted by the counter in the two periods before.

Thus, the energization changeover timing signals S1' to S3' produced and output by the timing decision and speed detecting section 222 are supplied to the control section 223. The control section 223 outputs the energization signals P1 to P6 for making the ON/OFF control of the transistors Q1 to Q6 to excite the respective stator coils 225 to 227 according to the speed control signal from the adder 240 to be described afterward and a predetermined exciting method (e.g., two-phase exciting). And, the energization changeover timing (commutation timing) is based on the energization changeover timing signals S1' to S3' output from the timing decision and speed detecting section 222. Therefore, the control section 223 produces such energization signals P1 to P6 that the respective exciting currents in the stator coils 225 to 227 become those as shown in FIGS. 11(G), (H), (I).

In the motor control device according to this embodiment, the timing decision and speed detecting section 222 produces the energization changeover timing signals as described above. In addition, it determines the rotational speed of the rotor, and based on the determined rotational speed, it makes the speed control consisting of a close loop. The operations of the respective sections involved in this speed control will be described below.

To make the speed control, the timing decision and speed detecting section 222 detects to renew the rotational speed of the rotor at each of the times t1, t2, t3 . . . when the respective edges of the rotor position signals S1 to S3 are detected. Therefore, in the timing decision and speed detecting section 222, the average value of the counted value counted by the counter in the period T1 and the counted value counted by the counter in the period T2 is determined at time t3 for example, and the rotational speed of the rotor is determined from a reciprocal of the determined average value. The sum of the period T1 and the period T2 corresponds to 120° in electrical angle, and since a physical distance corresponding to this electrical angle of 120° is known, the rotational speed of the rotor can be determined as described above.

Similarly, the timing decision and speed detecting section 222 determines the average value of the counted value counted by the counter in the period T2 and the counted value counted by the counter in the period T3 at time t5 and determines to update the rotational speed of the rotor from the reciprocal of the determined average value; and furthermore determines the average value of the counted value counted by the counter in the period T3 and the counted value counted by the counter in the period T4 at time t7 and determine to update the rotational speed of the rotor from the reciprocal of the determined average value. Therefore, the respective counted values of the counter are used with overlapping when the rotational speed of the rotor is determined.

Thus, the rotational speed of the rotor determined at 60° in electrical angle by the timing decision and speed detecting section 222 is obtained by determining the average speed in a period corresponding to 120° in electrical angle such as the period T1 and the period T2. Therefore, the rotational speed of the rotor can be obtained accurately even if there is a difference between the positive and negative periods of the counter electromotive forces Va to Vb produced in the stator coils 225 to 227.

The rotational speed of the rotor determined by the timing decision and speed detecting section 222 is supplied to the adder 240. The adder 240 produces a speed control signal (deviation signal) from a deviation between the rotational speed and the speed command from the outside and outputs the produced speed control signal to the control section 223. The control section 223 makes PWM control of the energization signals P1 to P6 to be supplied to the transistors Q1 to Q6 according to the speed control signal, so that the rotational speed of the rotor is controlled to become a target value.

As described above, the motor control device according to this embodiment produces the rotor position signals S1 to S3 indicating the rotation positions of the rotor in view of the counter electromotive forces Va to Vb produced in the stator coils 225 to 227 of the motor 228, detects sequentially the edges of the rotor position signals S1 to S3 to count a time between the edges by means of the counter, and when a delay time is added with reference to the respective detected times of the edges to determine the energization changeover timing of the stator coils 225 to 227, uses the counted value counted by the counter in the period before the just previous period among the counted values of the counter to determine the delay time.

Therefore, even if the rotor section of the motor has variations in mechanical precision and the positive and negative periods of the counter electromotive forces produced in the stator coils of the motor are different, such a difference can be reflected in the delay time, so that the energization changeover timing of the stator coils 225 to 227 can be made accurately. Therefore, smooth rotations of the rotor and the noise reduction can be realized.

And, the motor control device according to this embodiment uses the counted value of the counter to sequentially detect and to update the rotational speed of the rotor at each of the times t1, t2, t3 . . . when the respective edges of the rotor position signals S1 to S3 are detected. But, for example at time t3, the average of the counted values of the counter in the previous period and the two periods before such as the period T1 and the period T2 is used to obtain the average speed.

Therefore, even if the rotor section of the motor has variations in mechanical precision and the positive and negative periods of the counter electromotive forces Va to Vb produced in the stator coils 225 to 227 have a difference, the obtained rotational speed of the rotor is good in precision, so that the precision of the speed control consisting of a close loop can be prevented from lowering.

The position detection means corresponds to the rotation position detection section 221 of FIG. 10, a clocking means and an energization changeover timing decision means corresponds to the timing and speed detecting section 222, and the exciting means corresponds to the control section 223 and the inverter section 224.

And, the clocking means and the energization changeover timing decision means described in claim 15 corresponds to the timing and speed detecting section 222 of FIG. 10.

The position detection means of claim 18 corresponds to the rotation position detection section 221 of FIG. 10, the exciting means corresponds to the timing and speed detecting section 222, the control section 223 and the inverter section 224, the rotational speed detection means corresponds to the timing and speed detecting section 222, and the control means corresponds to the adder 240 and the control section 223.

Besides, the position detection means of claim 19 corresponds to the rotation position detection section 221 of FIG. 10, the clocking means and the energization changeover timing decision means corresponds to the timing and speed detecting section 222, the exciting means corresponds to the control section 223 and the inverter section 224, the rotational speed detection means corresponds to the timing decision and speed detecting section 222, and the control means corresponds to the adder 240 and the control section 223.

The motor control device according to this embodiment adds a delay time with each of the detected time of the edges as reference to determine the energization changeover timing of the stator coils 225 to 227. And, to calculate the delay time, the counted value counted by the counter not in the period just before the decision but in the period before that period is used among the counted values of the counter. But, the delay time may be calculated, for example at time t7, by using the counted value of the counter, such as not only the counted value by the counter in the period T3 but also the counted value of the counter in the period T1 that a difference between the positive and negative periods of the counter electromotive forces produced in the stator coils 225 to 227 can be reflected.

The motor control device according to this embodiment uses the counted value of the counter to sequentially detect to update the rotational speed of the rotor, for example, uses the counted value of the counter in the previous period and the two periods before, such as the period T1 and the period T2 to determine the rotational speed of the rotor. But, the rotational speed of the rotor may be calculated by using not only the respective counted values of the counter in the period T3 and the period T4 at time t7 for example, but also the counted value of the counter which can reflect a difference of the counter electromotive force between the positive and negative periods produced in the stator coils 225 to 227, such as the respective counted values of the counter in the period T1 and the period T2.

Besides, in the aforesaid embodiment, the timing decision and speed detecting section 222 comprises a plurality of counters and the like, but it may also be configured of, for example, the timing decision and speed detecting section 222 and the control section 223 may be formed of a one-chip microcomputer, or a combination of a microcomputer and a counter.

Another embodiment of the present invention will be described.

Figure 16:
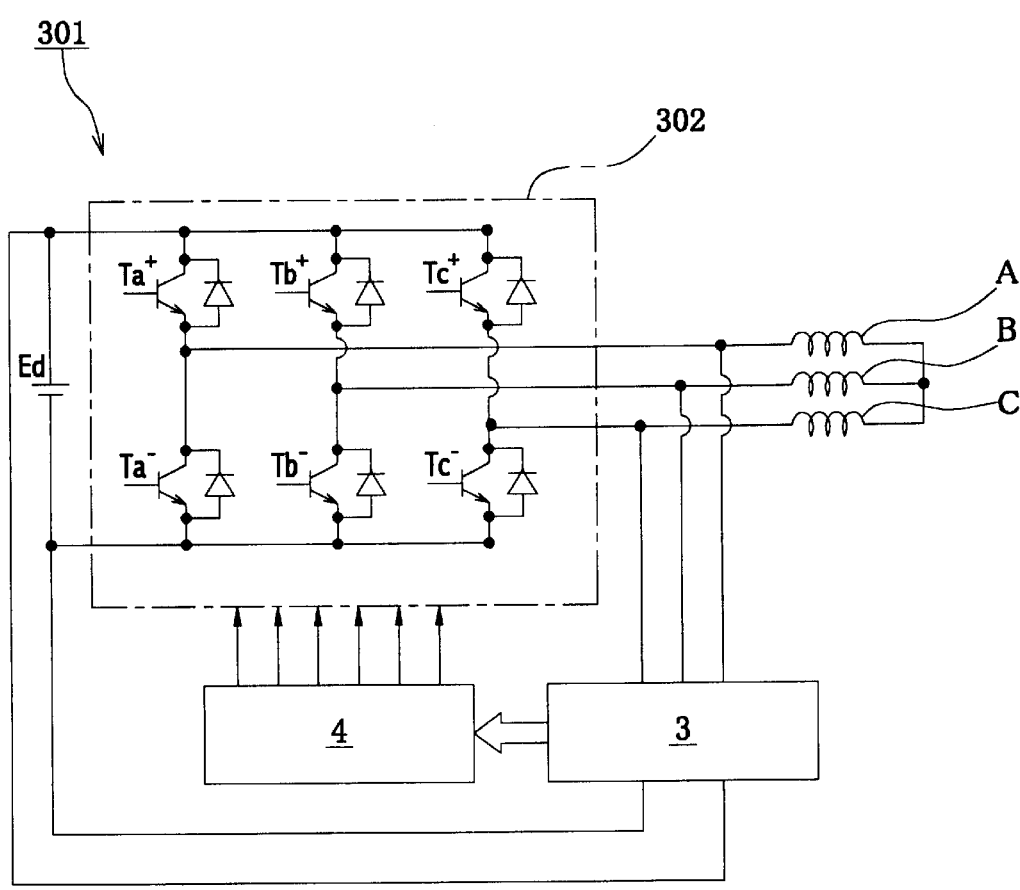
FIG. 16 is a circuit diagram showing the motor control device according to an embodiment of the present invention.
Figure 17:
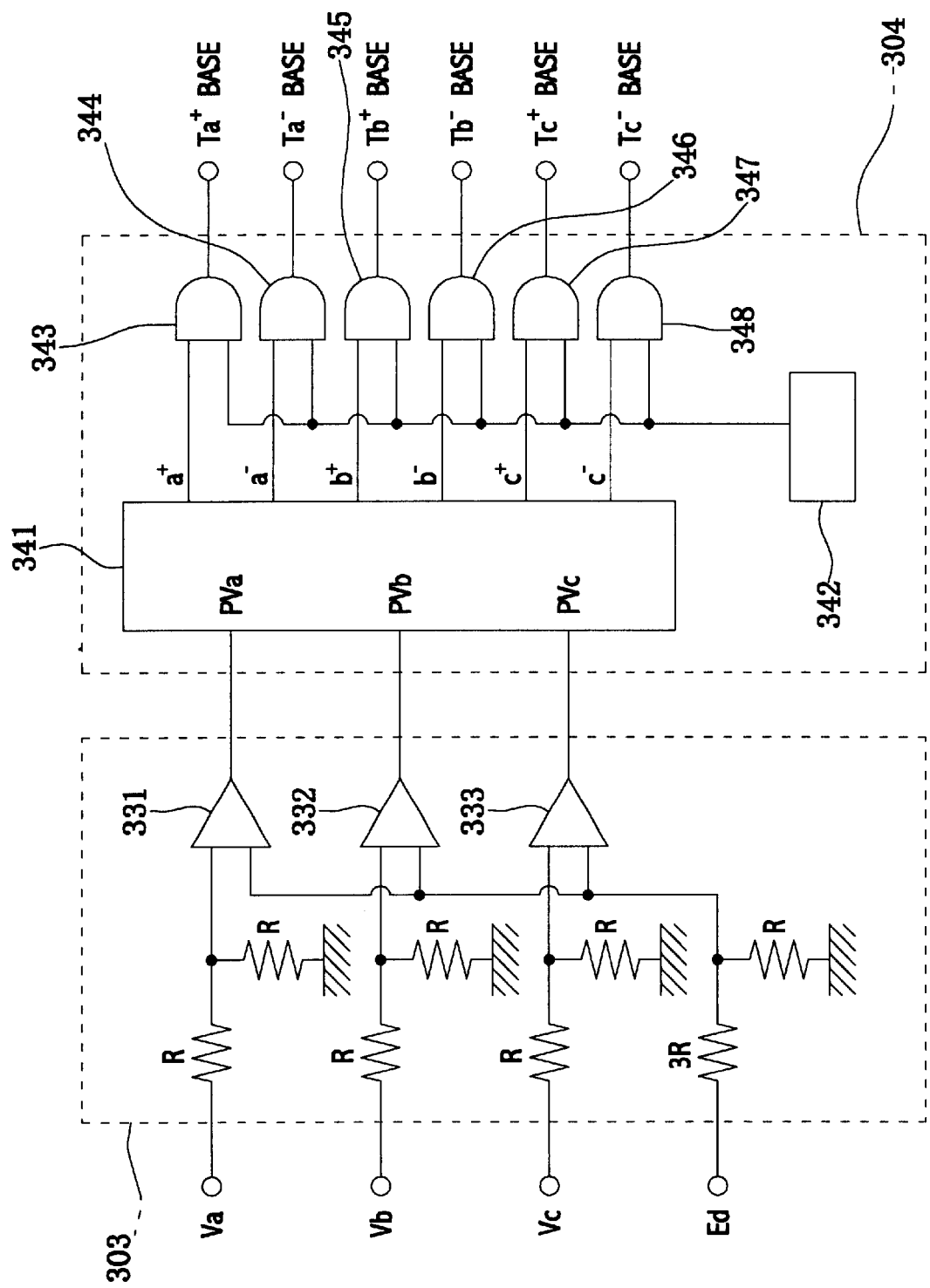
FIG. 17 is a circuit diagram showing a counter electromotive force detection circuit and a control circuit according to an embodiment of the invention.

As shown in FIG. 16 and FIG. 17, a motor control device 301 of this embodiment is used for a three-phase stepping motor (its general view is not shown) which rotates the rotor by causing commutation in three star-connected stator coils A, B, C, and comprises an inverter circuit 302 which includes positive side switching devices $Ta^+$, $Tb^+$, $Tc^+$ and negative side switching devices $Ta^-$, $Tb^-$, $Tc^-$ to supply power voltage Ed to the stator coils A, B, C, a counter electromotive force detection circuit 303 for detecting counter electromotive forces ea, eb, ec (see FIG. 18) of the stator coils A, B, C, and a control circuit 304 for controlling the inverter circuit 302 on the basis of output from the counter electromotive force detection circuit 303.

Each of the switching devices $Ta^+$, $Tb^+$, $Tc^-$, $Ta^-$, $Tb^-$, $Tc^-$ consists of a transistor and a free wheeling diode.

The counter electromotive force detection circuit 303 has a plurality of comparators 331, 332, 333. Terminal voltages Va, Vb, Vc of the stator coils A, B, C and a power voltage Ed are divided and inputted in the comparators 331, 332, 333 to have the terminal voltages Va, Vb, Vc of the stator coils A, B, C pulsed.

A voltage division ratio of the terminal voltages Va, Vb, Vc of the stator coils A, B,. C and a voltage division ratio of the power voltage are set to have a relation of 2 to 1. In this embodiment, the terminal voltages Va, Vb, Vc of the stator coils A, B, C have a voltage division ratio of (½), and the power voltage Ed has a voltage division ratio of (¼).

Rand 3R in FIG. 17 indicate a resistor for dividing the voltage into a predetermined ratio, and the division of each voltage is made by providing such resistors R, 3R.

Otherwise, it may be configured to input the terminal voltages Va, Vb, Vc of the stator coils A, B, C directly into the comparators 331, 332, 333. In this case, the terminal voltages Va, Vb, Vc of the stator coils A, B, C have a voltage division ratio of 1, and the power voltage Ed has a voltage division ratio of (½).

The control circuit 304 has a commutation signal transmission circuit (microcomputer in this embodiment) 341 which produces pulses a$^+$, a$^-$, b$^+$, b$^-$, c$^+$, c$^-$ to effect commutation in the stator coils A, B, C based on the terminal voltages Pva, PVb, PVc of the stator coils pulsed by the comparators 331, 332, 333 and a PWM circuit 342 for emitting a PWM signal.

Specifically, the pulses a$^+$, a$^-$, b$^+$, b$^-$, c$^+$, c$^-$ produced by the commutation signal transmission circuit 341 are passed together with the PWM signal through ANDs (AND elements) 343, 344, 345, 346, 347, 348 so to be the base for operating the respective switching elements Ta$^+$, Tb$^+$, Tc$^+$, Ta$^-$, Tb$^-$, Tc$^-$ of the inverter circuit 302. Therefore, these switching elements Ta$^+$, Tb$^+$, Tc$^+$, Ta$^-$, Tb$^-$, Tc$^-$ are sequentially switched by the control circuit 304, and the positive side and the negative side are simultaneously turned ON/OFF according to the PWM signal.

Figure 18:
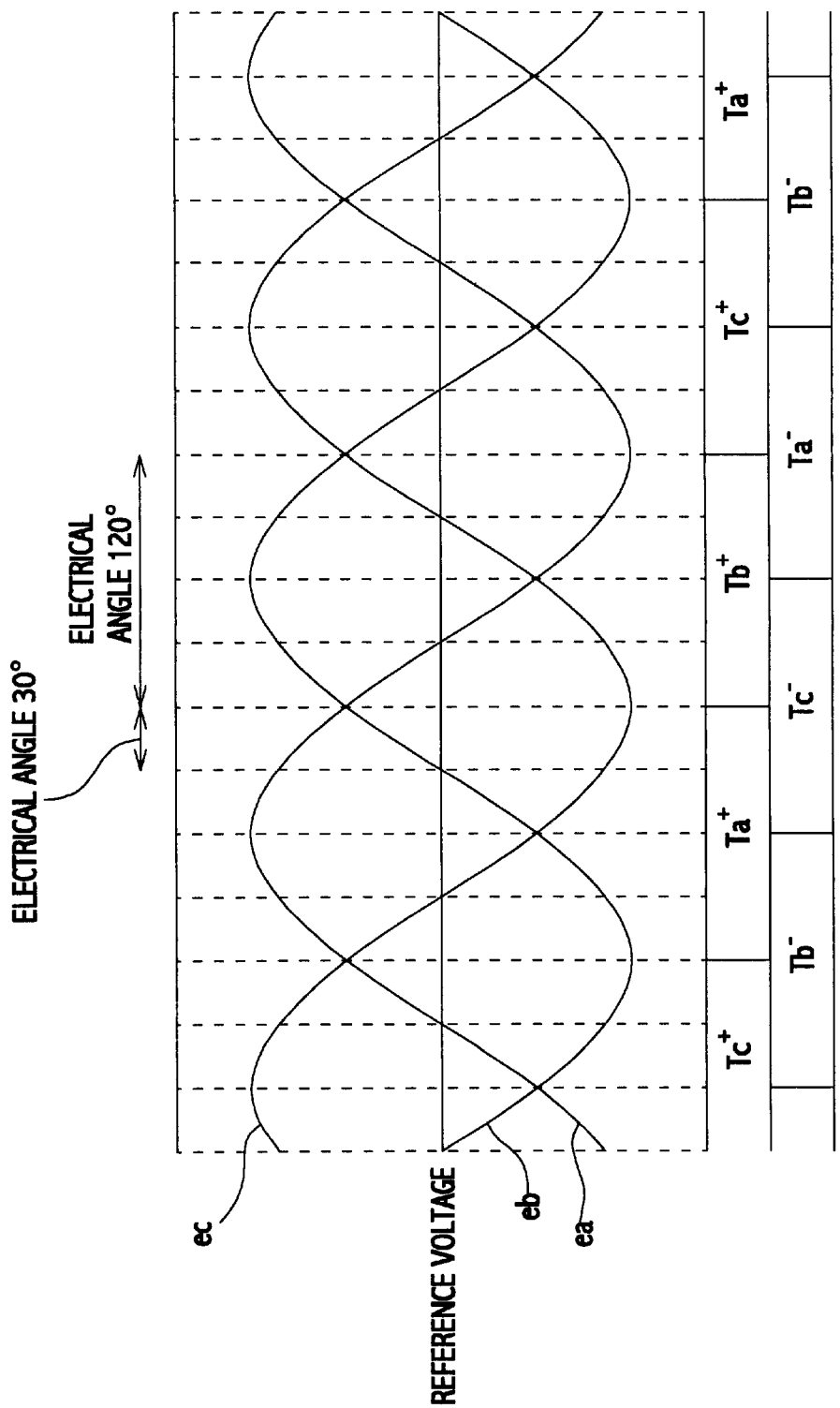
FIG. 18 is an explanatory diagram showing a counter electromotive force produced in the stator coil according to an embodiment of the invention.

FIG. 18 is an explanatory diagram showing counter electromotive forces ea, eb, ec of the stator coils A, B, C with the ½ voltage of the power voltage Ed determined as the reference voltage.

It is seen in FIG. 18 that a three-phase motor which has the stator coils A, B, C star-connected may effect commutation with an electrical angle of 30° shifted from the point where the terminal voltage in no exiting phase intersects with the reference voltage.

Therefore, as shown in FIG. 17 for example, the respective comparators 331, 332, 333 of the counter electromotive force detection circuit 303 detect intersections of the terminal voltages Va, Vb, Vc of the stator coils A, B, C divided into (½) and the power voltage Ed divided into (¼), to have the terminal voltages Va, Vb, Vc pulsed so to produce PVa, PVb, PVc.

Figure 19:
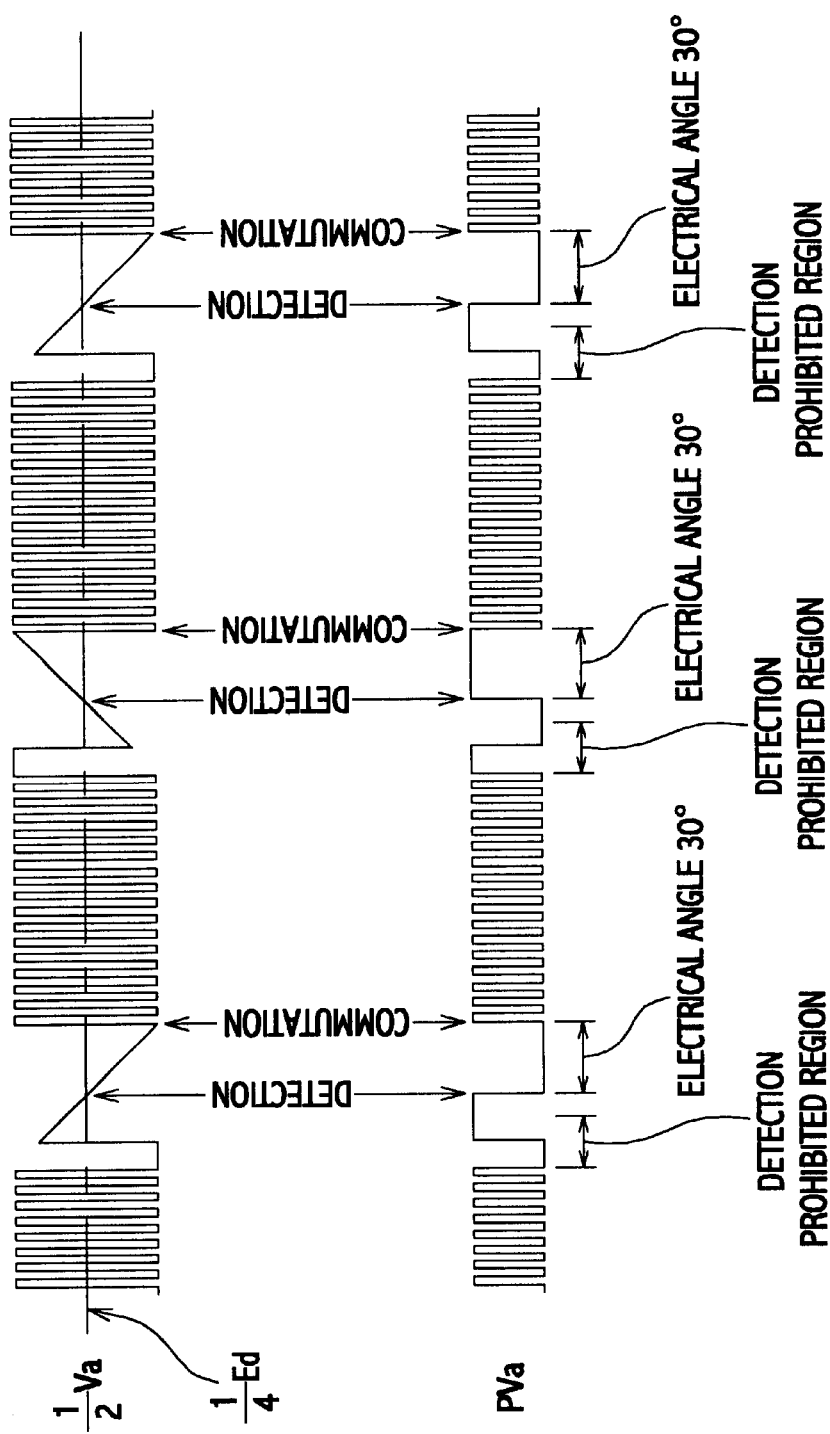
FIG. 19 is an explanatory diagram showing a counter electromotive force of the stator coil and an output pulse of a comparator according to an embodiment of the invention.

And in the commutation signal transmission circuit 341, the detection of the terminal voltages in the stator coils immediately after the commutation is prohibited in order to avoid an influence of a spike voltage produced immediately after the commutation. Specifically, as shown in FIG. 19, a detection-prohibited area is determined at required portions of the pulsed terminal voltages PVa, PVb, PVc. The detection-prohibited area has a length appropriately determined according to a spike voltage generation period because the spike voltage has a variable generation period depending on the motor current.

Figure 20:
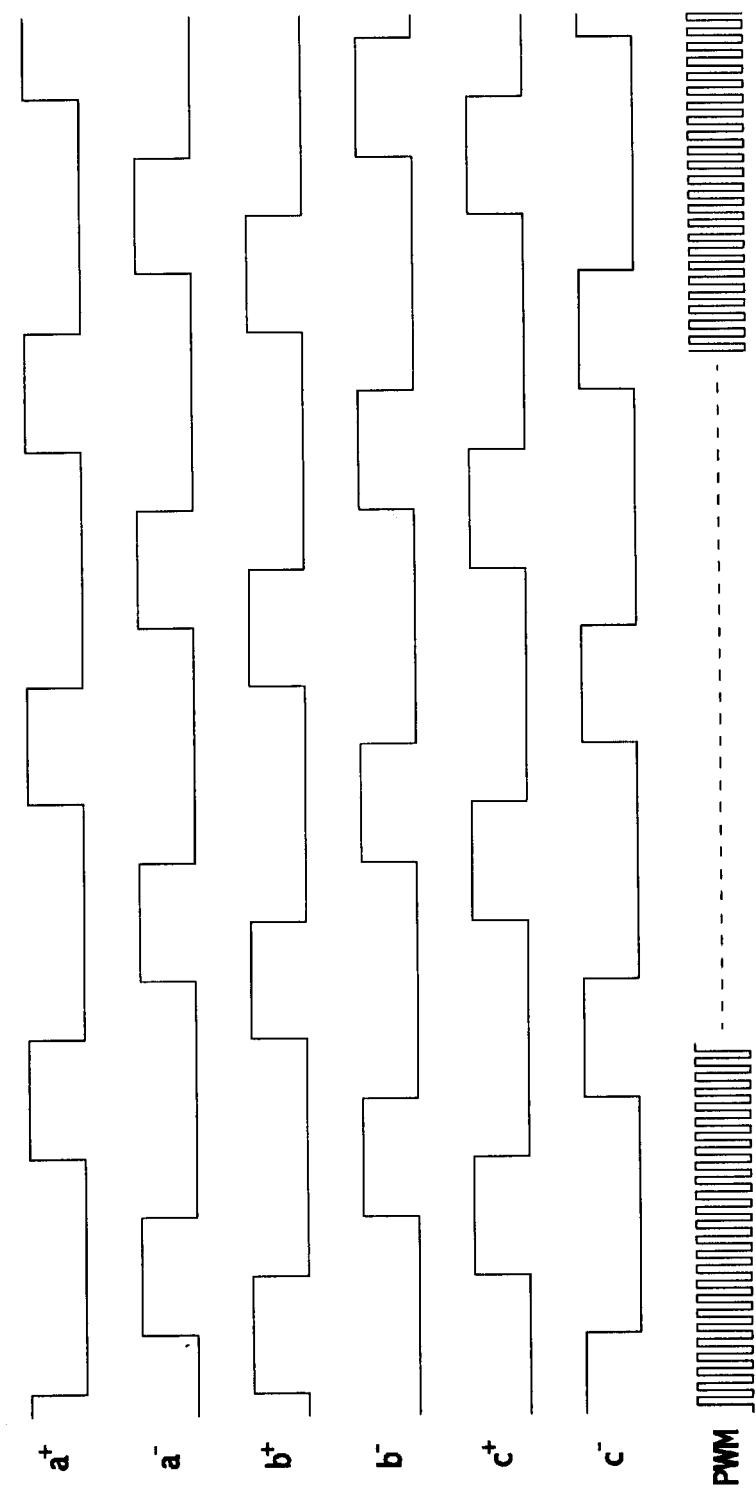
FIG. 20 is an explanatory diagram showing an output pulse and a PWM signal of a commutation signal transmission circuit according to an embodiment of the invention.

And the pulses a$^+$, a$^-$, b$^+$, b$^-$, c$^-$, c$^-$ for determining the timing of the commutation are obtained from the commutation signal transmission circuit 341 as shown in FIG. 20, and these pulses a$^+$, a$^-$, b$^+$, b$^-$, c$^+$, c$^-$ are subjected together with the PWM signal to AND processing.

Figure 21:
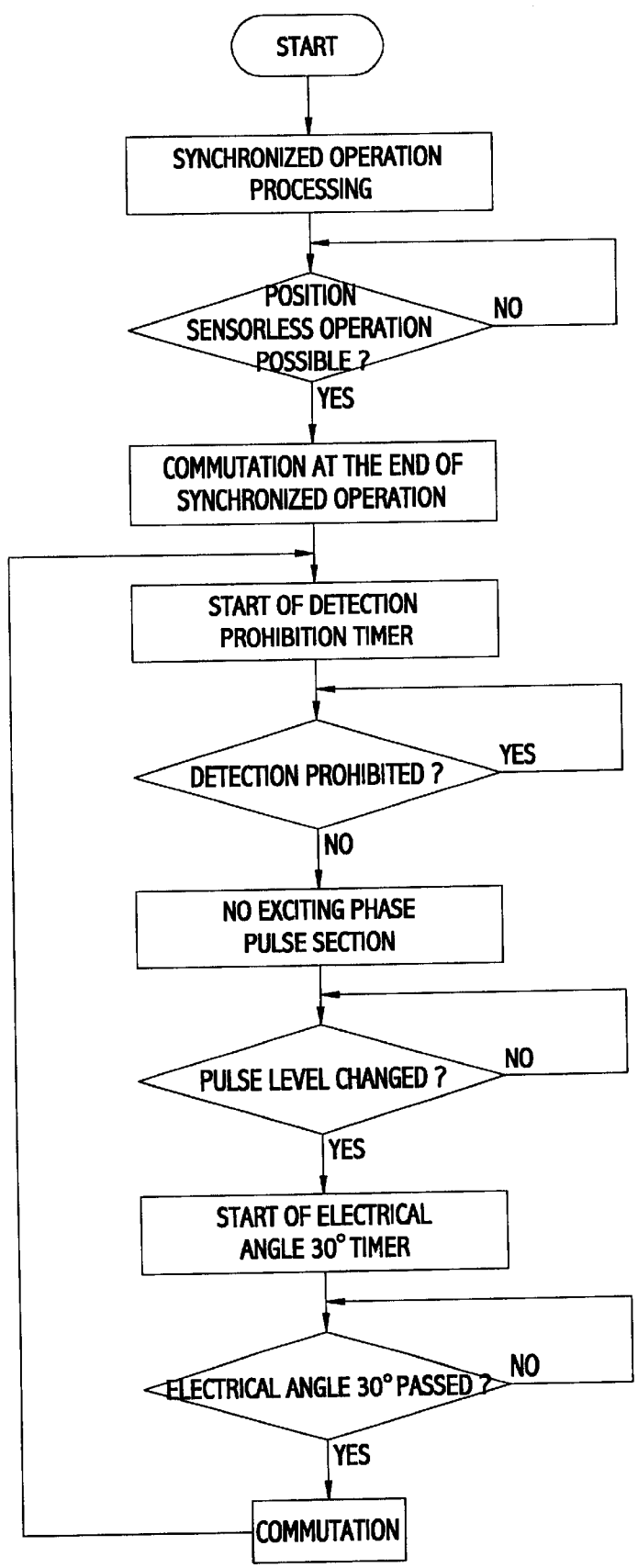
FIG. 21 is a flowchart showing the motor control according to an embodiment of the invention.

The motor control of this embodiment is conducted according to the flowchart shown in FIG. 21. In other words, the stepping motor is subjected to the synchronized operation in an early stage of rotations, and the control by the motor control device 301 is configured to be made from a state that the counter electromotive forces ea, eb, ec are sufficiently output.

As described above, the motor control device of this embodiment prevents an influence of the stator coils to the no exiting phase due to the PWM signal because the plus side switching element and the minus side switching element of the inverter circuit are simultaneously turned ON/OFF according to the PWM signal. Therefore, the position of the rotor can be detected accurately without adding any special circuit.

Besides, since the stator-coils-connecting-point potential of the motor does not change largely, this reference does not change largely, and oscillation between the output capacities of the switching elements and the stator coils can be prevented, and a detection error of the rotor position due to the oscillation can be prevented accordingly.

Especially, when only one of the plus side switching element and the minus side switching element is turned ON/OFF according to the PWM signal, the rotor position cannot be detected unless the switching element is ON. Therefore, it is necessary to make the PWM signal have a sufficiently high frequency. But the present invention can detect the rotor position without any problem even if the PWM signal has a low frequency.

Besides, the counter electromotive force detection circuit is provided with a comparator, and the terminal voltage of the stator coil is pulsed by inputting the terminal voltage of the stator coil into the comparator directly or after dividing and also inputting the power voltage after dividing. And, the terminal voltage of the stator coil and the power voltage are determined to have a voltage division ratio of 2 to 1, so that the terminal voltage of the stator coil can be pulsed accurately.

Particularly, according to the motor control device of this embodiment, the terminal voltage of the stator coil, which is divided into (½), and the power voltage, which is divided into (¼), are inputted into the comparator of the counter electromotive force detection circuit, so that the (½)-divided terminal voltage of the stator coil can be pulsed with reference to the (¼)-divided power voltage.

Furthermore, according to the motor control device of this embodiment, the control circuit has a commutation signal transmission circuit for producing a pulse to cause commutation in the stator coil on the basis of the terminal voltage of the stator coil pulsed by the comparator. In the commutation signal transmission circuit, the detection of the terminal voltage of the stator coil immediately after the commutation is prohibited, so that an influence of a spike voltage produced immediately after the commutation can be prevented. As a result, the inverter circuit can be controlled accurately even if the motor load is increased.

In addition, the motor control device of this embodiment can also be used for a three-phase stepping motor. And, the motor is suitable for driving a head carriage of a printer and a paper-feeding mechanism of a printer.

Another embodiment of the present invention will be described below.

Figure 22:
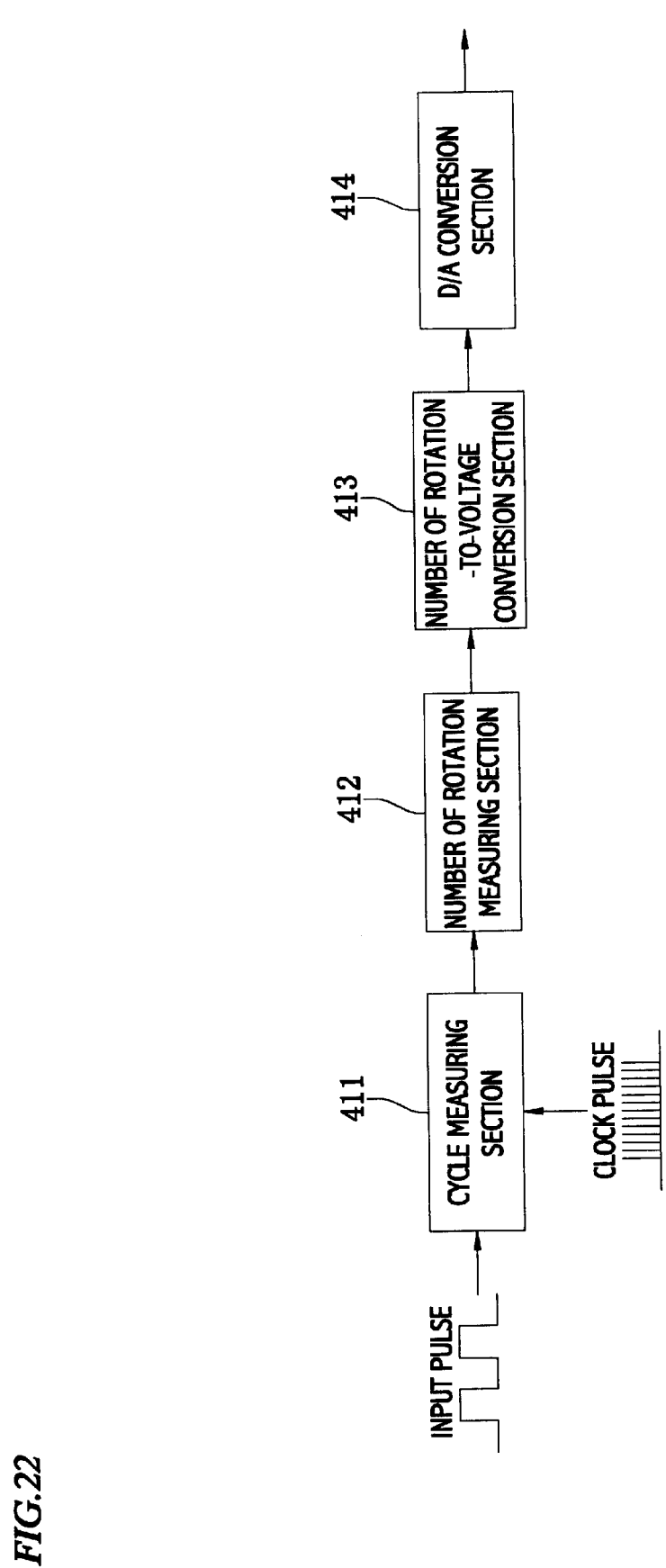
FIG. 22 is a block diagram showing an example of a structure of a first embodiment of a frequency-to-voltage conversion device of the present invention.
Figure 23:
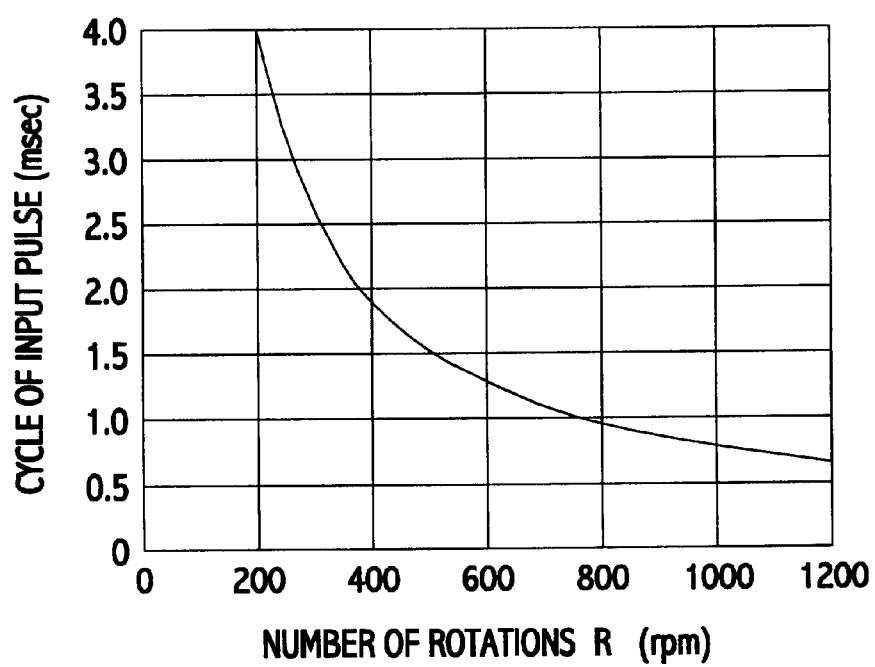
FIG. 23 is a diagram showing a relation between the number of rotations and an input pulse cycle.

A first embodiment of a frequency-to-voltage conversion device of the present invention will be described with reference to FIG. 22 to FIG. 24. FIG. 22 is a block diagram showing an example of the structure of the first embodiment of the frequency-to-voltage conversion device of the invention.

The frequency-to-voltage conversion device according to the first embodiment has a cycle measuring section 411, a number of rotations measuring section 412, a number of rotations-to-voltage conversion section 413 and a D/A conversion section 414 as shown in FIG. 22.

For example, when a detection pulse is inputted from a rotation detector (not shown) of the motor, the cycle measuring section 411 determines a cycle of the inputted pulse and is specifically configured of a counter or the like.

The number of rotations measuring section 412 is configured to measure a number of rotations of a motor or the like on the basis of a cycle from the cycle measuring section 411.

The number of rotations-to-voltage conversion section 413 is configured to produce an output voltage from a predetermined calculation expression on the basis of the number of rotations determined by the number of rotations measuring section 412. Here, the output voltage of the number of rotations-to-voltage conversion section 413 is an 8-bit digital voltage for example.

Since the output voltage of the number of rotations-to-voltage conversion section 413 is a digital voltage, the D/A conversion section 414 is configured to convert the digital voltage to an analog voltage to output it.

Now, the operation of the frequency-to-voltage conversion device according to the first embodiment configured as described above will be described.

For example, the detection pulse from a rotation detector (not shown) of the motor is inputted into the frequency measuring section 411, which determines a cycle of the inputted pulse. Specifically, the counter configuring the cycle measuring section 411 starts to count a clock pulse consisting of a predetermined frequency at a rising edge (or falling edge) of the inputted pulse and continues the counting operation until the rising edge (or falling edge) of the next inputted pulse. Since the clock pulse consists of a predetermined frequency, the cycle measuring section 411 can measure a cycle of the inputted pulse on the basis of the counted value of the counter.

The number of rotations measuring section 412 measures a number of rotations (rotational speed) on the basis of the measured cycle of the cycle measuring section 411. The measured cycle and the number of rotations by the cycle measuring section 411 are mutually related as shown in FIG. 23 for example. Therefore, the number of rotations measuring section 412 is provided with a table satisfying the relation as shown in FIG. 23 for example so to determine the number of rotations R with reference to the table.

Figure 24:
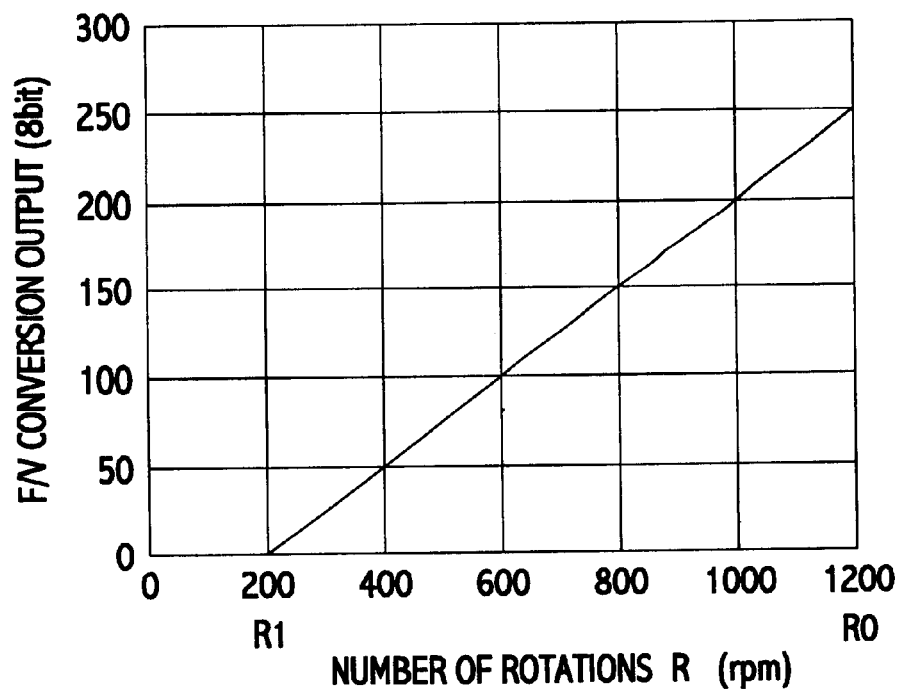
FIG. 24 is a diagram showing a relation between the number of rotations and an output voltage.

On the basis of the number of rotations (rotational speed) R measured by the number of rotations measuring section 412, the number of rotations-to-voltage conversion section 413 outputs, if output data is 8 bits for example, an output voltage V according to the following conversion expressions (1) to (3). Its example is shown in FIG. 24.

$$V=0 \ (0 \leq R \leq R1) \quad (1)$$

$$V=m \times R+h \ (R1 \leq R \leq R0) \quad (2)$$

$$V=255 \ (R0 \leq R) \quad (3)$$

where, m is a proportionality coefficient, h is a constant, and R0, R1 are values indicating a range of number of rotations as shown in FIG. 24. The scale in FIG. 24 is an example and its numerical value does not have a particular meaning.

Therefore, when the proportionality coefficient m and the constant h in the conversion expression (2) are set to any numerical value and the number of rotations R is within a predetermined range (from R1 to R0 in FIG. 24, more specifically from 200 rpm to 1200° rpm), it is determined that the output voltage V can be fully variable from a lower limit to an upper limit (0 to 255 in FIG. 24) in the output range, so that the output voltage V can be generated in proportion to the rotational speed R. And, when the number of rotations R deviates from the aforesaid range, the lower limit value ("0" in FIG. 24) and the upper limit value ("255" in FIG. 24) can be output as the output voltage V.

The D/A conversion section 414 makes the D/A conversion of the output voltage in the digital type from the number of rotation-to-voltage conversion section 413 into an analog voltage and outputs it.

As described above, the frequency-to-voltage conversion device of the first embodiment does not output with delay because it does not have a filter element as a conventional device does. And, linearity of the output voltage can be secured because the output voltage in the output range is proportional to the number of rotations. Besides, a dynamic range can be determined wide because output inclination and output range can be changed readily by changing the constants m, h of the conversion expression (2).

The frequency-to-voltage conversion device of FIG. 22 was made to use the aforesaid conversion expressions when the number of rotations-to-voltage conversion section 413 produces the output voltage. But, when the relation between the number of rotations R and the output voltage V corresponding to the number of rotations R is known in advance as shown in FIG. 24, the number of rotations-to-voltage conversion section 413 can be replaced by a number of rotations-to-voltage conversion table in which the number of rotations R and the output voltage V are accommodated.

Thus, when the output voltage is obtained with reference to the number of rotations-to-voltage conversion table, its calculation time to determine the output voltage can be made short as compared with the case of the number of rotations-to-voltage conversion section 413 using the conversion expression.

Now, a second embodiment of the frequency-to-voltage conversion device of the present invention will be described with reference to FIG. 25 and FIG. 26.

Figure 25:
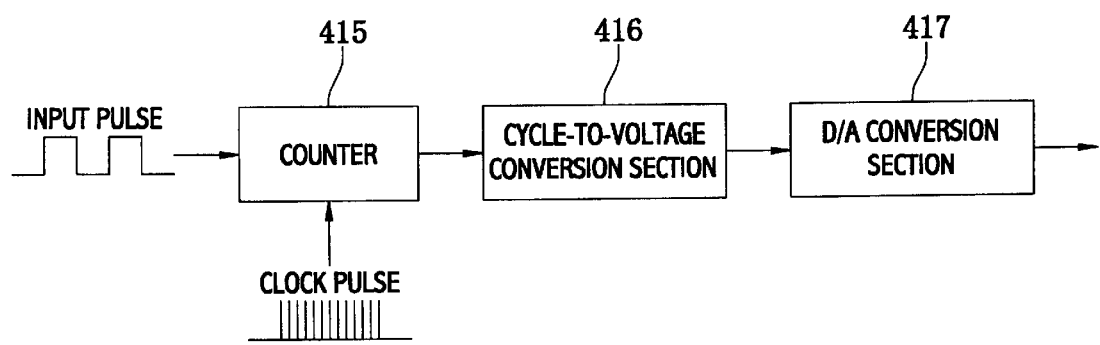
FIG. 25 is a block diagram showing an example of a structure of a second embodiment of the frequency-to-voltage conversion device of the invention.

The frequency-to-voltage conversion device of the second embodiment has a counter 415, a cycle-to-voltage conversion section 416 and a D/A conversion section 417 as shown in FIG. 25.

For example, when a detected pulse is input from a rotation detector (not shown) of the motor, the counter 415 determines a count value of a cycle of the input pulse.

The cycle-to-voltage conversion section 416 is configured to produce an output voltage from a predetermined conversion expression on the basis of the counted value of the cycle of the input pulse determined by the counter 415. Here, the voltage produced by the cycle-to-voltage conversion section 416 is, for example, an 8-bit digital voltage.

Since the output voltage from the cycle-to-voltage conversion section 416 is a digital voltage, the D/A conversion section 417 makes the D/A conversion of the digital voltage to an analog voltage to output it.

Now, the operation of the frequency-to-voltage conversion device configured as described above will be described hereinbelow.

For example, when the detected pulse from a rotation detector (not shown) of the motor is inputted into the counter 415, the counter 415 starts to count a clock pulse formed of a predetermined frequency at a rising edge (or falling edge) of the input pulse and continues the clock pulse counting operation until a rising edge (or falling edge) of the next input pulse. And, upon completing the counting operation, the counter 415 outputs the final counted value as a cycle counted value NC indicating the cycle of the input pulse to the cycle-to-voltage conversion section 416 and restarts the counting operation.

Figure 26:
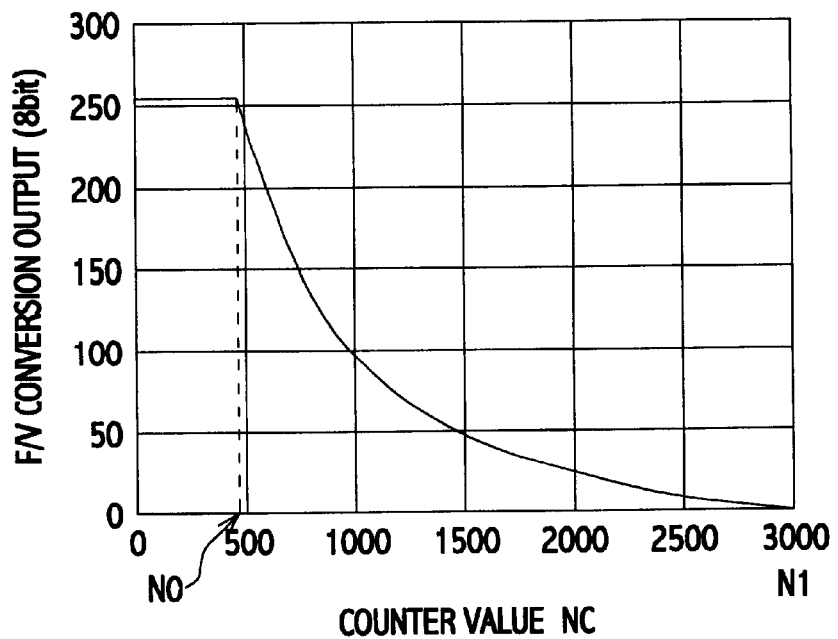
FIG. 26 is a diagram showing a relation between a count value and an output voltage.

When the output data is 8 bits for example, the cycle-to-voltage conversion section 416 outputs the output voltage V on the basis of the cycle counted value NC from the counter 415, according to the following conversion expressions (4) to (6). One example is shown in FIG. 26.

$$V=255 \ (0 \leq NC < N0) \quad (4)$$

$$V=k/NC+b(N0 \leq NC \leq N1) \quad (5)$$

$$V=0 \ (N1 < NC) \quad (6)$$

where, k is a proportionality coefficient, b is a constant, and N0, N1 are values of the count value NC when the output voltage V becomes an upper limit value and a lower limit value as shown in FIG. 26.

Now, derivation of the conversion expression (5) V=k/NC+b will be described hereinbelow.

Generally, the input pulse which is inputted into the counter 415 consists of x pulses per rotation of the motor. Now, it is assumed that the rotor is rotating at a rotational speed R [rpm]. Then, a cycle t of the input pulse inputted into the counter 415 is expressed by the following expression (7).

$$t=60/(R \times x) \text{ [sec]} \qquad (7)$$

When a constant (60/x) is replaced by a proportionality coefficient k1, the relation between the rotational speed R and the input pulse cycle t is indicated by the following expression (8).

$$t=k1/R \qquad (8)$$

Where a count clock pulse has a cycle tc, the cycle count value NC output from the counter 415 is indicated by the following expression (9).

$$NC=t/tc=k1/(tc \times R) \qquad (9)$$

When a constant (k1/tc) is replaced by a proportionality coefficient k2, the number of rotations is indicated by the following expression (10).

$$R=k2/NC \qquad (10)$$

As indicated by the expression (2), the output voltage V and the number of rotations R are mutually related as indicated by V=m×R+h. By substituting the expression (10) into the expression V=m×R+h, the relation between the cycle count value NC of the input pulse and the output voltage V is indicated by the following expression (11).

$$V=m \times (k2/NC)+h \qquad (11)$$

When the constants (m×k2) and h are replaced with k and b, the expression is indicated as V=k/NC+b, where k=60 m/(x×tc).

As described above, upon completing the counting of the cycle of the input pulse by the counter 415 to obtain the count value NC of the cycle, the frequency-to-voltage conversion device of FIG. 25 directly determines the output voltage V without determining the rotational speed as the frequency-to-voltage conversion device of FIG. 22 did. Therefore, a processing time for output computation can be shortened.

The counting means described in claim 24 corresponds to the counter shown in FIG. 25 and the voltage generation means corresponds to the cycle-voltage conversion section 416 and the D/A conversion section 417 of the same figure. And, the conversion table described in claim 25 corresponds to a table 441 of FIG. 31 to be described afterward.

Now, the motor control device using the aforesaid frequency-to-voltage conversion device will be described with reference to FIG. 27.

Figure 27:
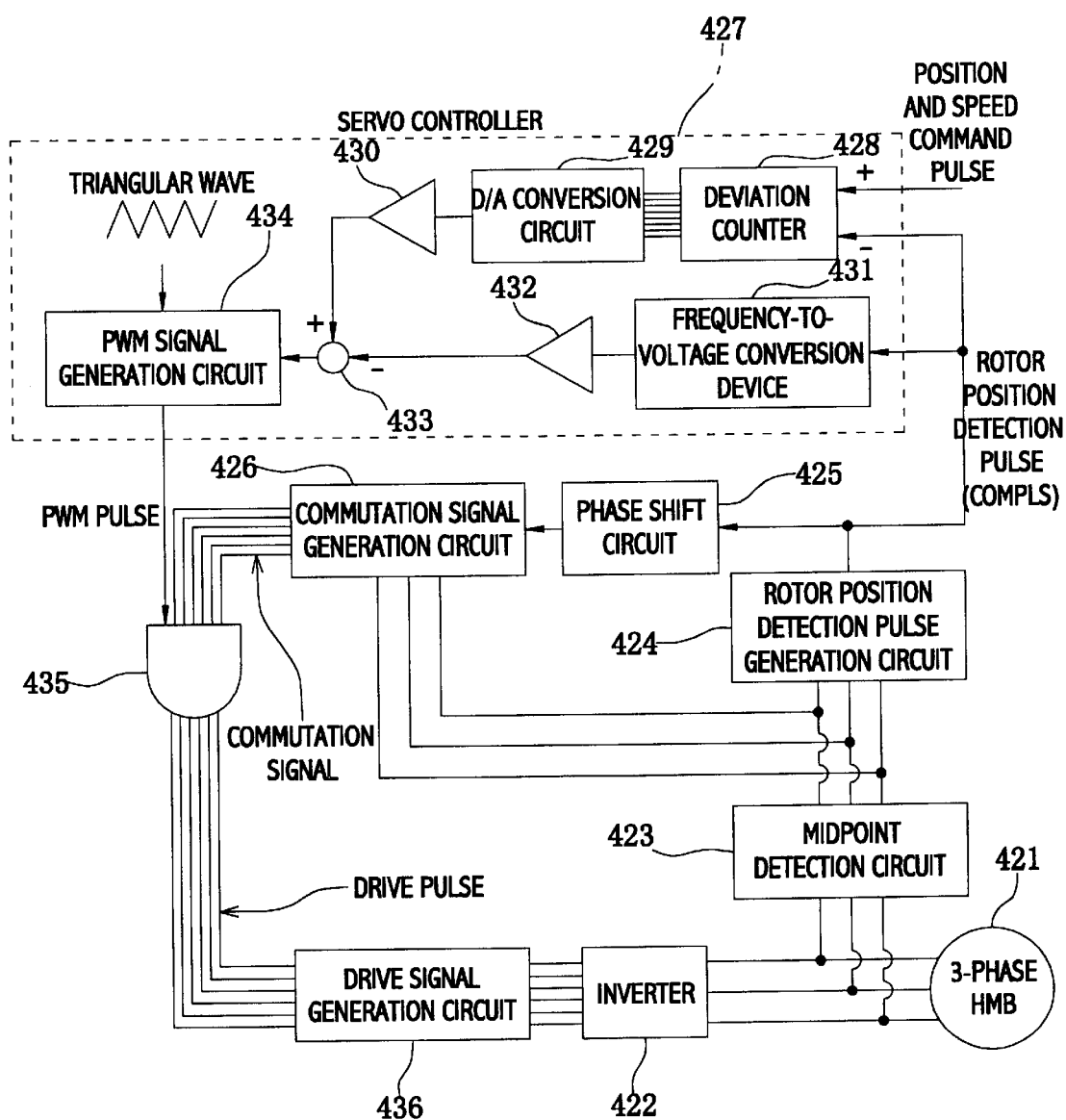
FIG. 27 is a block diagram showing an example of the motor control device where a frequency-to-voltage conversion device according to the invention is applied to position sensorless close-loop drive and control of a three-phase hybrid type stepping motor.
Figure 28:
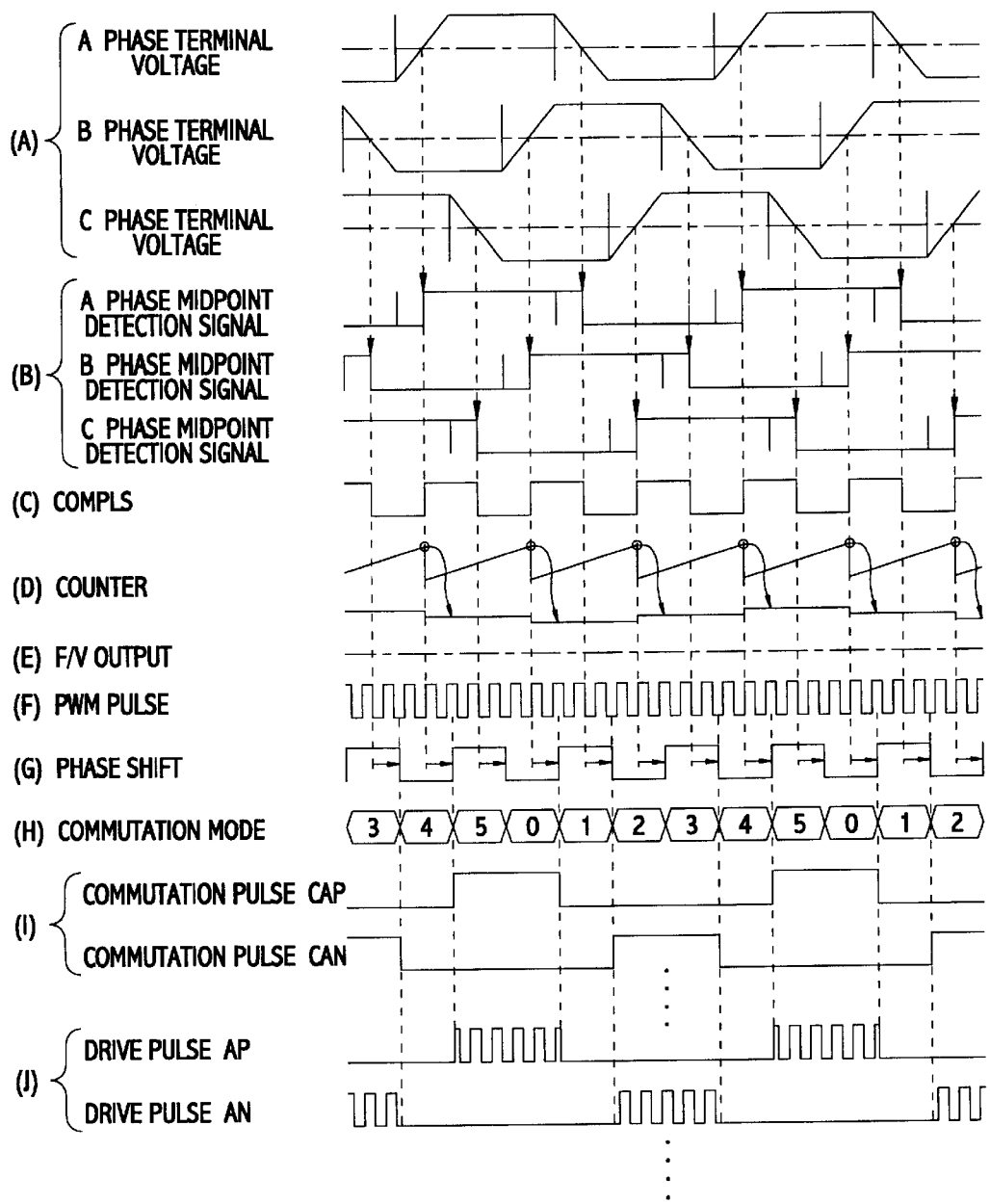
FIG. 28 is a waveform diagram (time chart) showing examples of signal waveforms of the respective portions of FIG. 27.

FIG. 27 is a block diagram showing an example of the motor control device in a situation that the frequency-to-voltage conversion device corresponding to the one shown in FIG. 25 is applied for the position sensorless close loop driving and control of a three-phase hybrid type stepping motor. FIG. 28 is a waveform diagram showing an example of signal waveform in each section of FIG. 27.

This motor control device consists of a large number of circuits as shown in FIG. 27, but most of such circuits maybe realized by means of microcomputers.

As shown in FIG. 27, this motor control device is provided with a 120-degree energization voltage type inverter 422 for driving a three-phase hybrid type stepping motor (three-phase HBM) 421. A midpoint detection circuit 423 is configured to detect an intersection of the ½ voltage point with three terminal voltage waveforms of the motor 421 shown in FIG. 28(A) so to output the midpoint detection signals as shown in FIG. 28(B). A rotor position detection pulse generation circuit 424 is configured, on the basis of the midpoint detection signal output from the midpoint detection circuit 423, to extract only the midpoint of the no exiting phase counter electromotive force for three phases (see FIG. 28(A)) to produce a rotor position detection pulse (COMPLS) having a level inverted at every electrical angle of 60°.

Since the rotor position detection pulse produced by the rotor position detection pulse generation circuit 424 is obtained in a leading phase with respect to commutation timing, a phase shift circuit 425 is designed to delay the phase of the pulse by a leading phase only. A commutation signal generation circuit 426 is configured to output a commutation signal corresponding to the next commutation mode on the basis of a rotor position detection pulse with a phase delayed by the phase shift circuit 425.

Thus, the basic structure of the position sensorless close loop drive is as described above. And, the motor 421 can be driven by driving the inverter 422 based on the commutation signal obtained as described above.

The drive of the motor 421 based on the aforesaid structure only, however, has a drawback that the rotational speed is varied when a load on the motor 421 is changed. Therefore, in order to remedy the drawback, it is necessary to make the speed control. And, the aforesaid frequency-to-voltage conversion device is used to feedback the speed information.

And, for example, when the motor 421 is used to drive a printer carriage or to drive a paper-feeding mechanism, it is necessary to control the position in addition to the speed. Accordingly, in the motor control device shown in FIG. 27, position and speed commands (the position is instructed in the number of pulses and the speed is instructed in a pulse rate) are given from the outside, and a servo controller 427, which makes the rotations follow the command, is added to the aforesaid structure as shown in FIG. 27.

The servo controller 427 has a deviation counter 428, a D/A conversion circuit 429, an amplifier circuit 430, a frequency-to-voltage conversion device 431, an amplifier circuit 432, an adder 433, and a PWM signal generation circuit 434 as shown in FIG. 27.

The deviation counter 428 counts a position and speed command pulse (drive profile) and a rotor position detection pulse from the rotor position detection pulse generation circuit 424 and outputs a deviation with respect to the instructed position. The D/A conversion circuit 429 is configured to output, after making the D/A conversion, the output deviation from the deviation counter 428. The amplifier circuit 430 is configured to amplify the output voltage from the D/A conversion circuit 429 to output to the adder 433.

Since the feedback control by means of the aforesaid deviation counter 428 is a simple proportional control, the control system oscillates when a gain is increased in order to enhance responsivity. Therefore, the servo controller 427 is configured to enhance the dumping property by adding a speed feedback control system consisting of the frequency-to-voltage conversion device 431 and the like.

The frequency-to-voltage conversion device 431 corresponds to the frequency-to-voltage conversion device shown in FIG. 22 or FIG. 25 and is configured to output a voltage corresponding to the rotational speed on the basis of the rotor position detection pulse produced by the rotor position detection pulse generation circuit 424. The amplifier circuit 432 is configured to amplify the output voltage from the frequency-to-voltage conversion device 431 to output it to the adder 433. The adder 433 is configured to determine a difference between the output voltage of the amplifier circuit 430 and the output voltage of the amplifier circuit 432 to output the obtained difference of voltage to the PWM signal generation circuit 434.

The PWM signal generation circuit 434 is configured to output a PWM signal in a duty ratio according to the output voltage from the adder 433. The PWM signal is combined with the commutation signal from the commutation signal generation circuit 426 by a combining circuit 435 to produce a drive pulse. Based on the produced drive pulse, a drive signal generation circuit 436 controls the inverter 422.

Now, the operation of each section of the motor control device configured as described above will be described with reference to FIG. 27 and FIG. 28.

With the rotations of the rotor of the motor 421, an counter electromotive force is produced in the stator coils, and the motor 421 has terminal voltage waveforms as shown in FIG. 28 (A). Thus, based on the terminal voltages as shown in FIG. 28 (A), the midpoint detection circuit 423 produces midpoint detection signals (rotor position signals indicating a rotor position of the motor 421) as shown in FIG. 28(B).

The rotor position detection pulse generation circuit 424 extracts the respective rising and falling (spike voltage and PWM component not considered) edges from the midpoint detection signals for three phases from the midpoint detection circuit 423 to combine them and produces a rotor position detection pulse (COMPLS) which has a level inverted at every electrical angle of 60° as shown in FIG. 28(C).

A counter (not shown) configuring the frequency-to-voltage conversion device 431 starts to count from "zero" at the rising edge of the rotor position detection pulse from the rotor position detection pulse generation circuit 424, outputs a voltage value corresponding to the count value at the rising edge of the next pulse and is reset as shown in FIG. 28(D). In the frequency-to-voltage conversion device 431, the counter repeats the aforesaid operation, and an output voltage shown in FIG. 28(E) is output according to the counter value. Details of the operation of the frequency-to-voltage conversion device 431 will be described in detail afterward. The output voltage of the frequency-to-voltage conversion device 431 is amplified by the amplifier circuit 432 and output to the adder 433.

Meanwhile, the deviation counter 428 counts a position and speed command pulse and a rotor position detection pulse produced by the rotor position detection pulse generation circuit 424 and outputs a deviation with respect to the commanded position. This output deviation is subjected to the D/A conversion by the D/A conversion circuit 429, amplified by the amplifier circuit 430 and output to the adder 433.

The adder 433 outputs a difference of voltage between the output voltage from the amplifier circuit 430 and the output voltage from the amplifier circuit 432 to the PWM signal generation circuit 434. The PWM signal generation circuit 434 compares the output voltage from the adder 433 with a triangular waveform and outputs a PWM signal (PWM pulse) as shown in FIG. 28(F).

The edge of the rotor position detection pulse produced by the rotor position detection pulse generation circuit 424 is obtained in a leading phase with respect to the commutation timing, so that the phase shift circuit 425 delays the phase of the rotor position detection pulse as shown in FIG. 28(G). The commutation signal generation circuit 426 produces and outputs a commutation signal (commutation pulse) corresponding to the next commutation mode with the edge timing of the rotor position detection pulse with its phase delayed as shown in FIG. 28(I).

The PWM signal from the PWM signal generation circuit 434 is superposed on the commutation signal from the commutation signal generation circuit 426 by the combining circuit 435, and drive pulses as shown in FIG. 28(J) are output from the combining circuit 435. Based on these drive pulses, the drive signal generation circuit 436 controls the inverter 422 to rotate the motor 421.

Now, the operation of the frequency-to-voltage conversion device 431 will be described in detail with reference to the flowcharts of FIG. 29 and FIG. 30.

The rotor position detection pulse produced by the rotor position detection pulse generation circuit 424 includes the rotational speed information about the motor 421, and since the level is inverted at every electrical angle of 60° as described above, the rotational speed of the motor 421 can be measured by measuring its cycle.

Therefore, the frequency-to-voltage conversion device 431 measures the cycle of the rotor position detection pulse (COMPLS), but the cycle measurement is conducted by counting the number of clock pulses with a predetermined frequency by an unillustrated counter over a period of from the rising edge (or falling edge) of the rotor position detection pulse to the next rising edge (or falling edge) (see FIGS. 28(C), (D)).

Figure 29:
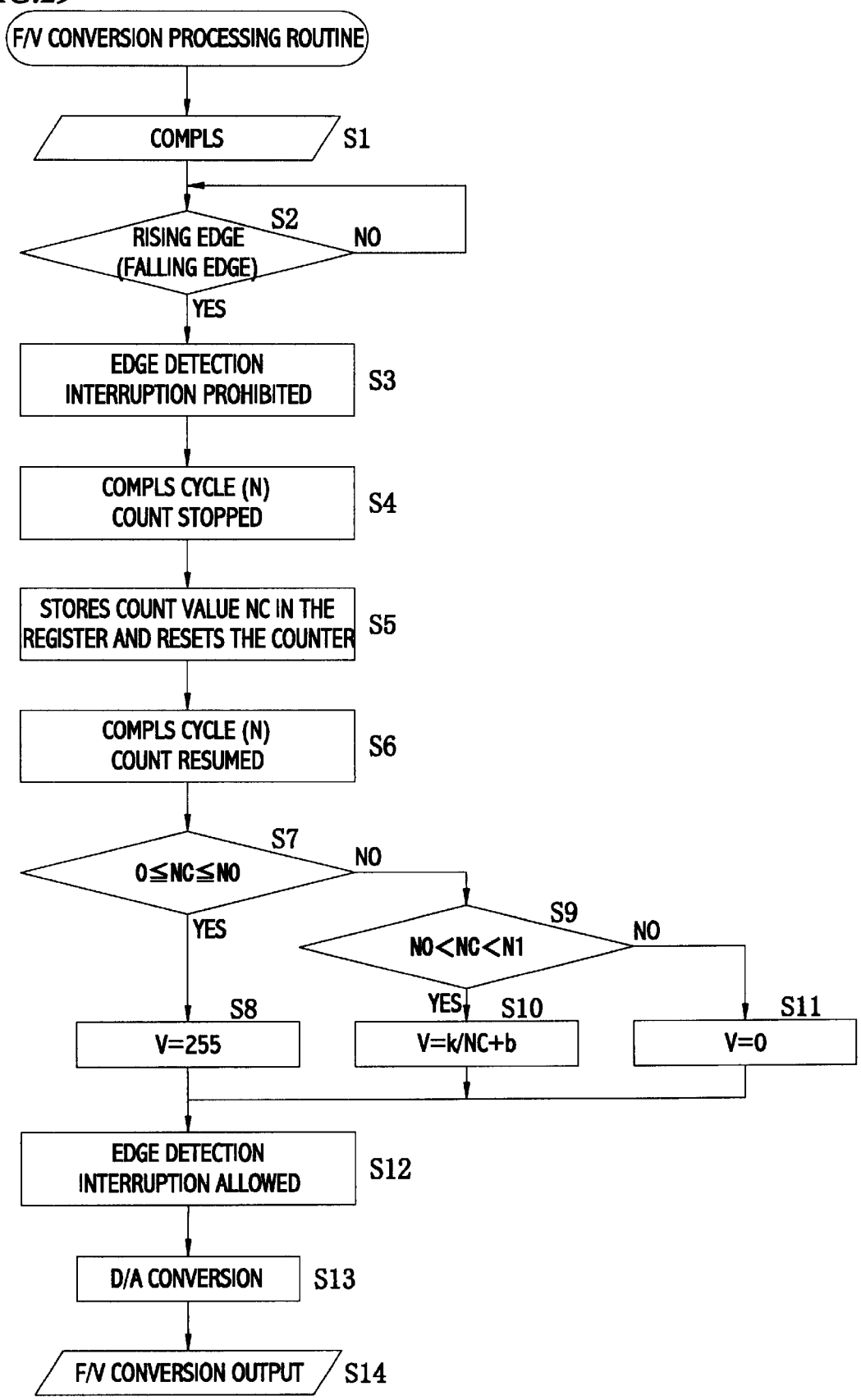
FIG. 29 is a flowchart showing an example of frequency-to-voltage conversion processing by a frequency-to-voltage conversion device.
Figure 30:
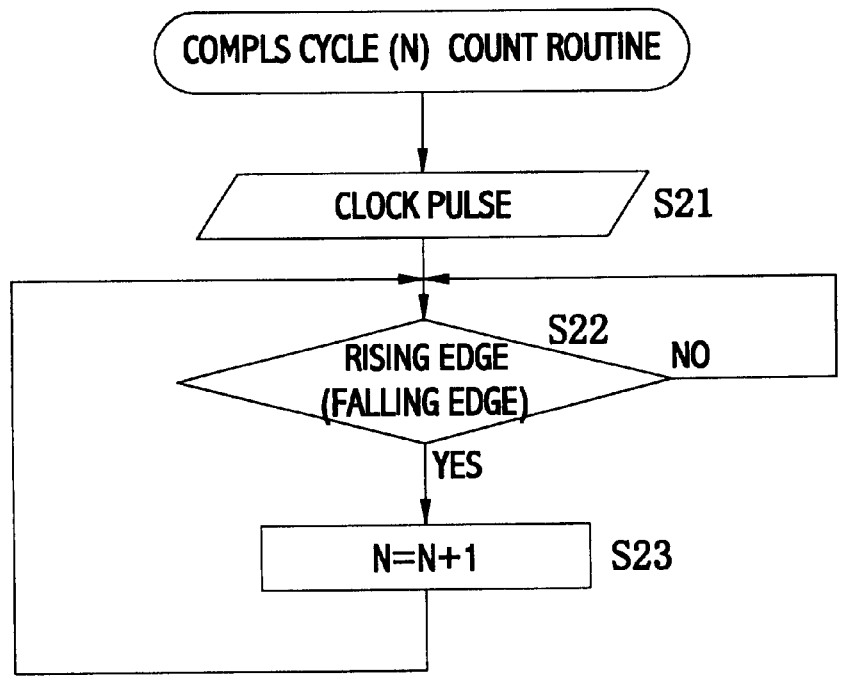
FIG. 30 is a flowchart showing counting processing of a cycle of a rotor position detection pulse by the same device.

This counting operation of the counter is conducted according to the rotor position detection pulse (COMFLS) cycle count routine as shown in FIG. 30 independent of the frequency-to-voltage conversion processing (F/V conversion processing) shown in FIG. 29.

Specifically, the counting operation of the cycle of the rotor position detection pulse by the counter is performed by taking in the clock pulse with a predetermined frequency (step S21), detecting the rising (or falling) edge of the clock pulse (step S22: Yes), and also up-counting each variable (count value) N of the counter (step S23) as shown in FIG. 30.

Meanwhile, the frequency-to-voltage conversion processing is performed by taking in the rotor position detection pulse (COMPLS) (step S1), and by interrupting with the rising (or falling) edge of the rotor position detection pulse as shown in FIG. 29. Specifically, when the rising edge of the rotor position detection pulse is detected (step S2: Yes), the edge detection of the pertinent pulse is prohibited in order to avoid multiple interruption (step S3), thereby temporarily stopping the counting operation by the counter of the cycle of the rotor position detection pulse (step S4).

At this time, the count value counted by the rotor position detection pulse cycle count routine of FIG. 30 is stored in the counter, then, the final count value NC of the counter is stored in a register, the counter value is reset to "zero" (step S5), and the count operation by the counter of the cycle of the rotor position detection pulse is restarted (step S6).

Then, on the basis of the count value NC, steps S7 to S11 perform conversion processing to produce the output voltage V. This processing satisfies the conversion expressions (4) to (6) described above, and one example of the relation between the count value NC and the output voltage V is shown in FIG. 26.

First, it is judged in step S7 whether the count value NC is within the range of $0 \leq NC \leq N0$. When it is in that range (step S7: Yes), the output voltage V becomes "255", and if not (step S7: No), the processing advances to step S9.

In step S9, it is judged whether the count value NC is in the range of $N0 < NC < N1$, and when it is (step S9: Yes), the output voltage V is given as V=k/NC+b (step S10).

On the other hand, when it is judged in step S9 that the count value NC is not within the aforesaid range (step S9: No), namely the count value NC is $N1 \leq NC$, the output voltage V becomes "zero" (step S11).

When the output voltage V is output as described above, to detect the edge of the next rotor position detection pulse, the detection of the pertinent edge is allowed (step S12). Besides, the output voltage V is subjected to the D/A conversion by an unillustrated D/A converter (step S13) to finally convert into an analog amount to determine as the output of the frequency-to-voltage conversion device 431 (step S14).

Now, replacement of the respective calculation processes in steps S7 to S11 in the frequency-to-voltage conversion processing shown in FIG. 29 by the table processing will be described with reference to FIG. 31.

Figure 31:
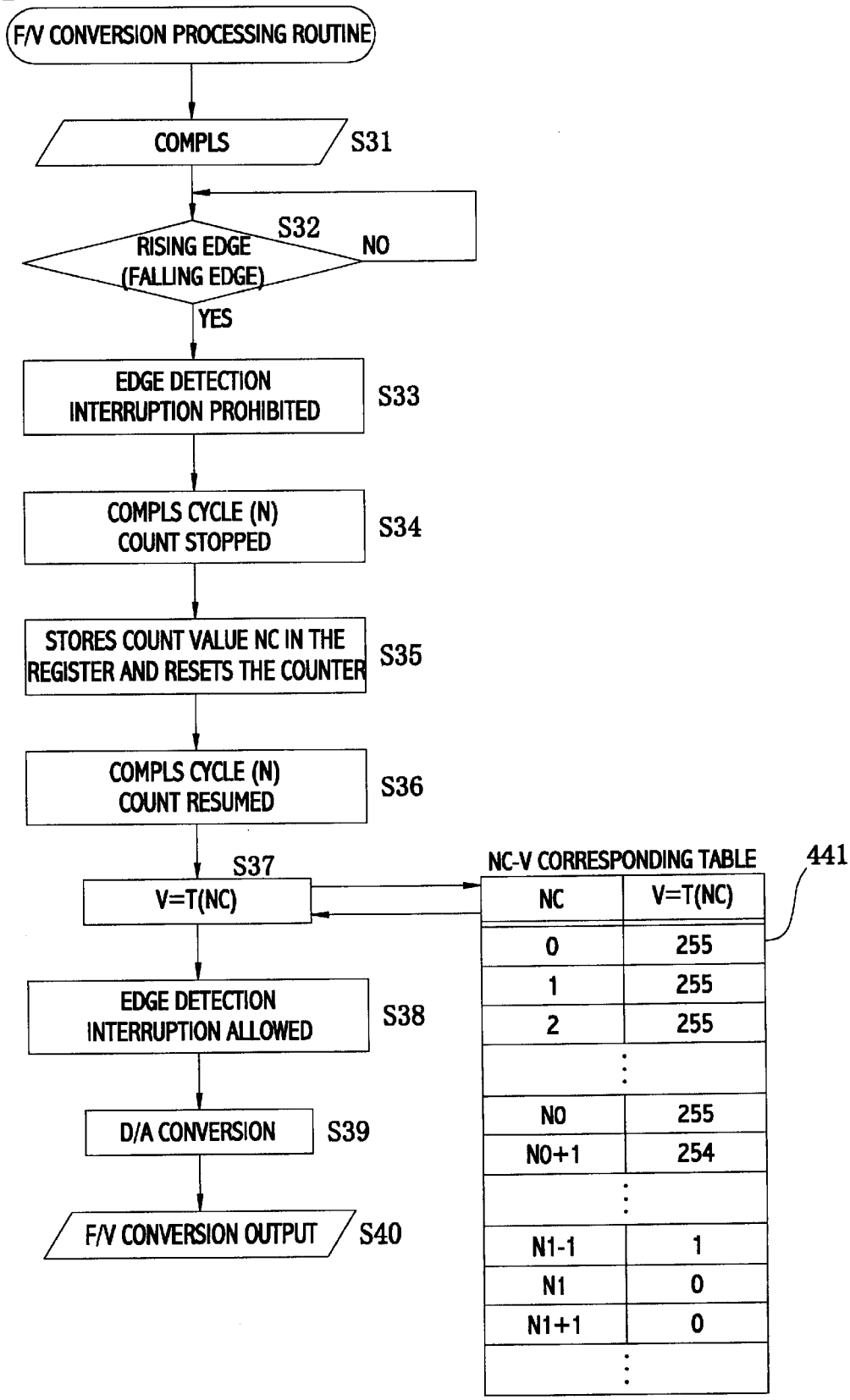
FIG. 31 is a flowchart showing an example of frequency-to-voltage conversion processing by using a table.
Figure 32:
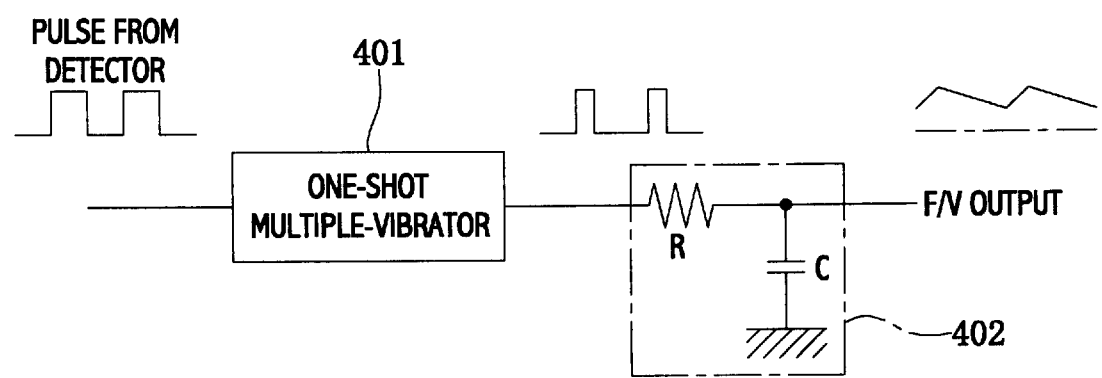
FIG. 32 is a diagram showing a structure of a conventional device.

As shown in FIG. 26, where the count value NC and its corresponding output voltage V are known, the relation between the count value NC and its corresponding output voltage V is previously described (stored) in an NC-V corresponding table 441 shown in FIG. 31. And, when the frequency-to-voltage conversion processing is conducted, the output voltage V is determined from the count value NC with reference to the table 441 in step S37. Thus, time to determine the output voltage V can be reduced as compared with the frequency-to-voltage conversion processing shown in FIG. 29.

In the frequency-to-voltage conversion processing shown in FIG. 31, steps S31 to S36 excepting step S37 correspond to steps S1 to S6 of FIG. 29 and steps S38 to S40 correspond to Steps S12 to S14 of FIG. 29. Therefore, descriptions of such steps are omitted.

As described above, the motor control device of this embodiment does not have its output delayed. It can secure linearity in its output range with respect to the rotational speed. And, since the frequency-to-voltage conversion device used can have a wide dynamic range, responsivity of the 3-phase hybrid type stepping motor can be improved.

The rotor position signal generation means described in claim 25 corresponds to the midpoint detection circuit 423 of FIG. 26, the exciting means corresponds to the commutation signal generation circuit 426 and the inverter 422 of the same figure, the counting means and the voltage generation means correspond to the frequency-to-voltage conversion device 431 of the same figure, and the control means corresponds to the servo controller 427 of the same figure.

INDUSTRIAL APPLICABILITY

The present invention relates to a method and a device which can make accurate positioning control of a motor when it is controlled by particularly using a counter electromotive force produced in stator coils, and more particularly, it is preferably used for a hybrid stepping motor. And, a motor to which the present invention is applied is suitable for various types of drive mechanisms and a paper-feeding mechanism for a printer requiring accurate positioning.

What is claimed is:

1. A method for controlling a position sensorless motor which is provided with a synchronized operation and a position sensorless operation and has operation mode-switching means for switching between such operations, comprising the steps of:

exciting stator coils of the motor in synchronization with a position command signal during the synchronized operation to rotate the rotor;

detecting a rotation position of the rotor based on counter electromotive forces produced in the stator coils during the position sensorless operation, exciting the stator coils in synchronization with the detected rotation position of the rotor to rotate the rotor, determining a deviation between a target position and the present position from a target rotation position and the detected rotation position according to the position command signal, and making a position sensorless close loop drive based on the determined deviation; and adding a predetermined bias to the deviation at the time of starting the position sensorless operation and then decreasing the bias.

2. The method for controlling a position sensorless motor according to claim 1, wherein switching from the synchronized operation to the position sensorless operation is conducted under a condition that the counter electromotive forces produced in the stator coils have reached a predetermined level, and switching from the position sensorless operation to the synchronized operation is conducted under a condition that the deviation has become zero.

3. A device for controlling a position sensorless motor which is provided with a synchronized operation and a position sensorless operation and has operation mode-switching means for switching between such operations, comprising:

stator coil drive means which excites stator coils of the motor in synchronization with a position command signal when the synchronized operation is selected by the operation mode-switching means and, when the position sensorless operation is selected, detects the rotation position of the rotor based on counter electromotive forces produced in the stator coils, and excites the stator coils in synchronization with the detected rotation position of the rotor;

deviation calculation means which determines a deviation between a target position and the present position from the position command signal and the detected rotation position of the rotor when the position sensorless operation is selected by the operation mode-switching means;

control means which controls the drive of the stator coil drive means according to the deviation determined by the deviation calculation means when the position sensorless operation is selected by the operation mode-switching means; and bias control means which adds a predetermined bias to the deviation determined by the deviation calculation means immediately after the selection of the position sensorless operation by the operation mode-switching means and decreases the bias with a lapse of time.

4. The device for controlling a position sensorless motor according to claim 3, wherein the operation mode-switching means has frequency measuring means for measuring a frequency of the position command signal, switches from the synchronized operation to the position sensorless operation when a frequency of the position command signal exceeds a predetermined value, and switches the position sensorless operation to the synchronized operation when the deviation becomes zero.

5. A method for controlling a position sensorless motor which is provided with a synchronized operation and a position sensorless operation and has operation mode-switching means for switching between such operations, comprising the steps of:

exciting stator coils of the motor in synchronization with a position command signal during the synchronized operation to rotate a rotor;

detecting a rotation position of the rotor based on counter electromotive forces produced in the stator coils during the position sensorless operation, exciting the stator coils in synchronization with a rotor rotation position signal indicating the detected rotation position of the rotor to rotate the rotor;

determining a deviation between a target position and the present position from a target rotation position and the detected rotation position of the rotor according to the position command signal, adding an integral value of the determined deviation to the deviation, determining a rotor rotational speed on the basis of the rotor rotation position signal, making a position sensorless close loop drive on the basis of a value obtained by subtracting the rotor rotational speed from an added value of the deviation and the integral value of the deviation; and setting a predetermined initial value for the integral value of the deviation when the synchronized operation is switched to the position sensorless operation by the operation mode-switching means.

6. The method for controlling a position sensorless motor according to claim 5, wherein:

the operation mode-switching means has frequency measuring means for measuring a frequency of the position command signal; and the operation mode-switching means changes the operation mode to the position sensorless operation when a frequency of the position command signal or a counter electromotive force level exceeds a first predetermined value after starting the synchronized operation, and changes the position sensorless operation to the synchronized operation when the frequency of the position command signal or the counter electromotive force level becomes lower than a second predetermined value and the deviation is zero.

7. A device for controlling a position sensorless motor which is provided with a synchronized operation and a position sensorless operation and has operation mode-switching means for switching between such operations, comprising:

stator coil drive means which excites stator coils of the motor in synchronization with a position command signal when the synchronized operation is selected by the operation mode-switching means and, when the position sensorless operation is selected, detects the rotation position of the rotor based on counter electromotive forces produced in the stator coils to excite the stator coils in synchronization with a rotor rotation position signal indicating the detected rotation position of the rotor;

deviation calculation means which determines a deviation between a target position and the present position from a target rotation position according to the position command signal and the detected rotation position of the rotor when the position sensorless operation is selected by the operation mode-switching means;

integration means for determining an integral value of the deviation determined by the deviation calculation means;

rotational speed detection means for determining a rotor rotational speed on the basis of the rotor rotation position signal;

control means which controls the drive of the stator coil drive means on the basis of a value obtained by adding an integral value of the deviation to the deviation and subtracting the rotor rotational speed from the added value of the deviation and the integral value of the deviation; and initial value setting means for setting a predetermined initial value as the integral value of the deviation by the integration means when the synchronized operation is changed to the position sensorless operation by means of the operation mode-switching means.

8. The device for controlling a position sensorless motor according to claim 7, wherein the operation mode-switching means has frequency measuring means for measuring a frequency of the position command signal, changes the synchronized operation to the position sensorless operation when the frequency of the position command signal or a counter electromotive force level exceeds a first predetermined value, and changes the position sensorless operation to the synchronized operation when the frequency of the position command signal or the counter electromotive force level becomes lower than a second predetermined value and the deviation is zero.

9. A method for controlling a motor which detects a moment when a counter electromotive force produced in stator coils of the motor changes from plus to minus or from minus to plus, decides energization changeover timing of the stator coils by adding a delay time with reference to respective moments of the detection, and flows an electric current to the stator coils on the basis of the decided energization changeover timing to rotate the rotor, characterized in that the delay time is a measuring time which is among measuring times obtained by measuring a time between the respective detection moments and corresponds to a positive or negative period of the counter electromotive forces.

10. The method for controlling a position sensorless motor according to claim 9, wherein the delay time is a time obtained by sequentially measuring times between the respective detection moments and using the time which is used to measure earlier by one immediately before the decision of the energization changeover time.

11. A device for controlling a position sensorless motor, comprising:

position detection means for producing a rotor position signal indicating a rotation position of a rotor by comparing counter electromotive forces produced in stator coils of the motor with a predetermined voltage;

clocking means for detecting a moment of change in the rotor position signal produced by the position detection means and measuring a time between the detected moments of changes;

energization changeover timing decision means which adds a delay time with reference to the moments of changes detected by the clocking means to decide the energization changeover timing of the stator coils and uses as the delay time the measuring time corresponding to the positive and negative periods of the counter electromotive forces among the measured times by the clocking means; and exciting means for flowing an electric current to the stator coils with the energization changeover timing decided by the energization changeover timing decision means.

12. The device for controlling a position sensorless motor according to claim 11, wherein:

the clocking means sequentially detects rising and falling edges of the rotor position signal produced by the position detection means and sequentially measures a time between the detected edges; and the electrification changeover timing decision means, when respective edges are detected by the clocking means, decides the energization changeover timing of the stator coils by adding a delay time with reference to the respective moments of detection and uses as the delay time the time which is used to measure earlier by one immediately before the decision of the energization changeover timing by means of the clocking means.

13. A method for controlling a position sensorless motor which detects a position of a rotor by virtue of counter electromotive forces produced in stator coils of the motor and rotates the rotor by flowing an electric current to the stator coils on the basis of the detected position, characterized in that:

a moment of change of the counter electromotive force from plus to minus or from minus to plus is detected, a time between the detected moments of change is measured, a rotational speed of the rotor is determined from the average of two times corresponding to the plus and minus periods of the counter electromotive force among the measured times, and close loop control is performed according to the determined rotational speed.

14. A method for controlling a position sensorless motor which detects a position of a rotor by virtue of counter electromotive forces produced in stator coils of the motors and rotates the rotor by flowing an electric current to the stator coils on the basis of the detected position, characterized in that:

a moment of change of the counter electromotive force from plus to minus or from minus to plus is detected, a time between the detected moments of change is measured, a rotational speed of the rotor is determined at the every moment of change from the average to the last measured time and the measured time before last, and close loop control is made according to the determined rotational speed.

15. A device for controlling a motor, comprising:

position detection means for producing a rotor position signal indicating a rotation position of a rotor by comparing counter electromotive forces produced in stator coils of the motor with a predetermined voltage;

exciting means for flowing an electric current to the stator coils on the basis of the rotor position signal produced by the position detection means;

rotational speed detection means which sequentially detects a moment of the change from the rotor position signal produced by the position detection means, measures a time between the detected moments of the change, and determines a rotational speed of the rotor from the average of the two times corresponding to the plus and minus periods of the counter electromotive forces among the measured times; and control means for controlling the exciting means so to have the rotational speed determined by the rotational speed detection means agreed with a target value.

16. A device for controlling a position sensorless motor, comprising:

position detection means for producing a rotor position signal indicating a rotation position of a rotor by comparing counter electromotive forces produced in stator coils of the motor with a predetermined voltage;

clocking means which detects a moment of change of the rotor position signal produced by the position detection means and measures a time between the detected moments of change;

energization changeover timing decision means which adds a delay time with reference to the moments of change detected by the clocking means to decide the energization changeover timing of the stator coils and uses as the delay time the time corresponding to the plus and minus periods of the counter electromotive forces among the times measured by the clocking means;

exciting means for flowing an electric current to the stator coils with the energization changeover timing decided by the energization changeover timing decision means;

rotational speed detection means which determines the rotational speed of the rotor from the average of the two times corresponding to the plus and minus periods of the counter electromotive forces among the times measured by the clocking means; and control means for controlling the exciting means so to have the rotational speed determined by the rotational speed detection means agreed with a target value.

17. A device for controlling a position sensorless motor used for a motor having its rotor rotated by causing commutation in star-connected stator coils, comprising an inverter circuit which includes plus side switching devices and minus side switching devices to supply a power voltage to the stator coils, a counter electromotive force detection circuit for detecting counter electromotive forces of the stator coils, and a control circuit for controlling the inverter circuit on the basis of output from the counter electromotive force detection circuit; the control circuit having a PWM circuit which emits a PWM signal, and plus side switching devices and minus side switching devices of the inverter circuit being simultaneously turned ON/OFF according to the PWM signal, wherein:

the counter electromotive force detection circuit is provided with a comparator, and makes the terminal voltages of the stator coil pulsed by inputting the terminal voltages of the stator coils into the comparator directly or after dividing and also inputting the power voltage after dividing, and the terminal voltages of the stator coils and the power voltage are determined to have a voltage division ratio of 2 to 1.

18. The device for controlling a position sensorless motor according to claim 17, wherein the comparator of the counter electromotive force detection circuit has the terminal voltage of the stator coil inputted after dividing into (½) and the power voltage inputted after dividing into (¼).

19. The device for controlling a position sensorless motor according to claim 17, wherein the control circuit has a commutation signal transmission circuit which produces a pulse for causing commutation in the stator coils on the basis of the terminal voltage of the stator coils pulsed by the comparator, and the commutation signal transmission circuit prohibits the detection of the terminal voltage of the stator coils immediately after the commutation.

20. The device for controlling a position sensorless motor according to claim 18, wherein the control circuit has a commutation signal transmission circuit which produces a pulse for causing commutation in the stator coils on the basis of the terminal voltage of the stator coils pulsed by the comparator, and the commutation signal transmission circuit prohibits the detection of the terminal voltage of the stator coils immediately after the commutation.

21. The motor control device according to any one of claims 3, 4, 7, 11, 12, 15, 16, 17, 18, 19, 20, wherein the motor is a three-phase hybrid type stepping motor.

22. The motor control device according to any one of claims 3, 4, 7, 11, 12, 15, 16, 17, 18, 19, and 20, wherein the motor is to be used to drive at least one of a printer head carriage and a printer paper-feeding mechanism.

* * * * *